United States Patent
Lung et al.

(10) Patent No.: US 12,321,603 B2
(45) Date of Patent: Jun. 3, 2025

(54) HIGH BANDWIDTH NON-VOLATILE MEMORY FOR AI INFERENCE SYSTEM

(71) Applicant: MACRONIX INTERNATIONAL CO., LTD., Hsinchu (TW)

(72) Inventors: Hsiang-Lan Lung, Ardsley, NY (US); I-Ting Kuo, Taoyuan (TW)

(73) Assignee: Macronix International Co., Ltd., Hsinchu (TW)

( * ) Notice: Subject to any disclaimer, the term of this patent is extended or adjusted under 35 U.S.C. 154(b) by 79 days.

(21) Appl. No.: 18/112,784

(22) Filed: Feb. 22, 2023

(65) Prior Publication Data
US 2024/0281142 A1 Aug. 22, 2024

(51) Int. Cl.
*G06F 3/06* (2006.01)
*G06F 13/16* (2006.01)

(52) U.S. Cl.
CPC .......... *G06F 3/0613* (2013.01); *G06F 3/0659* (2013.01); *G06F 3/0679* (2013.01); *G06F 13/161* (2013.01); *G06F 2213/0062* (2013.01)

(58) Field of Classification Search
CPC .... G06F 3/0613; G06F 3/0659; G06F 3/0679; G06F 13/161; G06F 2213/0062
See application file for complete search history.

(56) References Cited

U.S. PATENT DOCUMENTS

| | | |
|---|---|---|
| 4,219,829 A | 8/1980 | Dorda et al. |
| 4,987,090 A | 1/1991 | Hsu et al. |
| 5,029,130 A | 7/1991 | Yeh |
| 5,586,073 A | 12/1996 | Hiura et al. |
| 5,963,803 A | 10/1999 | Dawson et al. |

(Continued)

FOREIGN PATENT DOCUMENTS

| | | |
|---|---|---|
| CN | 101432821 A | 5/2009 |
| CN | 1998012 B | 11/2010 |

(Continued)

OTHER PUBLICATIONS

H. Li, M. Bhargav, P. N. Whatmough and H. .—S. Philip Wong, "On-Chip Memory Technology Design Space Explorations for Mobile Deep Neural Network Accelerators," 2019 56th ACM/IEEE Design Automation Conference (DAC), Las Vegas, NV, USA, 2019, pp. 1-6. (Year: 2019).*

(Continued)

*Primary Examiner* — Eric T Oberly
(74) *Attorney, Agent, or Firm* — Andrew L. Dunlap; Haynes Beffel & Wolfeld LLP

(57) ABSTRACT

A high bandwidth non-volatile memory (NVM) is described suitable for providing neural network weight data to an AI accelerator processing core or cores. An artificial intelligence (AI) inference memory device employing the high bandwidth NVM technology as described herein can comprise a logic layer die including channel logic implementing connections between a plurality of channels for conducting data to and from an accelerator core via a bus and a plurality of non-volatile memory (NVM) dies stacked vertically one above another, forming a layered vertical stack of NVM dies, each of the NVM dies including at least one memory chip and a plurality of direct vertical connections to a corresponding channel in the logic layer.

20 Claims, 9 Drawing Sheets

(56) References Cited

U.S. PATENT DOCUMENTS

| | | | |
|---|---|---|---|
| 6,034,882 A | 3/2000 | Johnson et al. |
| 6,107,882 A | 8/2000 | Gabara et al. |
| 6,313,486 B1 | 11/2001 | Kencke et al. |
| 6,385,097 B1 | 5/2002 | Liao et al. |
| 6,486,027 B1 | 11/2002 | Noble et al. |
| 6,593,624 B2 | 7/2003 | Walker |
| 6,829,598 B2 | 12/2004 | Milev |
| 6,856,542 B2 | 2/2005 | Roy et al. |
| 6,906,940 B1 | 6/2005 | Lue |
| 6,960,499 B2 | 11/2005 | Nandakumar et al. |
| 7,081,377 B2 | 7/2006 | Cleeves |
| 7,089,218 B1 | 8/2006 | Visel |
| 7,129,538 B2 | 10/2006 | Lee et al. |
| 7,177,169 B2 | 2/2007 | Scheuerlein |
| 7,368,358 B2 | 5/2008 | Ouyang et al. |
| 7,436,723 B2 | 10/2008 | Rinerson et al. |
| 7,593,908 B2 | 9/2009 | Abdulkader et al. |
| 7,646,041 B2 | 1/2010 | Chae et al. |
| 7,747,668 B2 | 6/2010 | Nomura et al. |
| 7,948,024 B2 | 5/2011 | Kim et al. |
| 8,045,355 B2 | 10/2011 | Ueda |
| 8,154,128 B2 | 4/2012 | Lung |
| 8,203,187 B2 | 6/2012 | Lung et al. |
| 8,275,728 B2 | 9/2012 | Pino |
| 8,331,149 B2 | 12/2012 | Choi et al. |
| 8,432,719 B2 | 4/2013 | Lue |
| 8,564,045 B2 | 10/2013 | Liu |
| 8,589,320 B2 | 11/2013 | Breitwisch et al. |
| 8,630,114 B2 | 1/2014 | Lue |
| 8,725,670 B2 | 5/2014 | Visel |
| 8,860,124 B2 | 10/2014 | Lue et al. |
| 9,064,903 B2 | 6/2015 | Mitchell et al. |
| 9,111,617 B2 | 8/2015 | Shim et al. |
| 9,147,468 B1 | 9/2015 | Lue |
| 9,177,966 B1 | 11/2015 | Rabkin et al. |
| 9,213,936 B2 | 12/2015 | Visel |
| 9,379,129 B1 | 6/2016 | Lue et al. |
| 9,391,084 B2 | 7/2016 | Lue |
| 9,397,110 B2 | 7/2016 | Lue |
| 9,401,371 B1 | 7/2016 | Lee et al. |
| 9,430,735 B1 | 8/2016 | Vali et al. |
| 9,431,099 B2 | 8/2016 | Lee et al. |
| 9,520,485 B2 | 12/2016 | Lue |
| 9,524,980 B2 | 12/2016 | Lue |
| 9,535,831 B2 | 1/2017 | Jayasena et al. |
| 9,536,969 B2 | 1/2017 | Yang et al. |
| 9,589,982 B1 | 3/2017 | Cheng et al. |
| 9,698,156 B2 | 7/2017 | Lue |
| 9,698,185 B2 | 7/2017 | Chen et al. |
| 9,710,747 B2 | 7/2017 | Kang et al. |
| 9,747,230 B2 | 8/2017 | Han et al. |
| 9,754,953 B2 | 9/2017 | Tang et al. |
| 9,767,028 B2 | 9/2017 | Cheng et al. |
| 9,898,207 B2 | 2/2018 | Kim et al. |
| 9,910,605 B2 | 3/2018 | Jayasena et al. |
| 9,922,716 B2 | 3/2018 | Hsiung et al. |
| 9,978,454 B2 | 5/2018 | Jung |
| 9,983,829 B2 | 5/2018 | Ravimohan et al. |
| 9,991,007 B2 | 6/2018 | Lee et al. |
| 10,037,167 B2 | 7/2018 | Kwon et al. |
| 10,043,819 B1 | 8/2018 | Lai et al. |
| 10,056,149 B2 | 8/2018 | Yamada et al. |
| 10,073,733 B1 | 9/2018 | Jain et al. |
| 10,157,012 B2 | 12/2018 | Kelner et al. |
| 10,175,667 B2 | 1/2019 | Bang et al. |
| 10,211,218 B2 | 2/2019 | Lue |
| 10,242,737 B1 | 3/2019 | Lin et al. |
| 10,381,376 B2 | 8/2019 | Nishikawa et al. |
| 10,403,637 B2 | 9/2019 | Lue |
| 10,528,643 B1 | 1/2020 | Choi et al. |
| 10,534,840 B1 | 1/2020 | Petti |
| 10,540,591 B2 | 1/2020 | Gao et al. |
| 10,552,759 B2 | 2/2020 | Rich |
| 10,565,494 B2 | 2/2020 | Henry et al. |
| 10,635,398 B2 | 4/2020 | Lin et al. |
| 10,643,713 B1 | 5/2020 | Louie et al. |
| 10,719,296 B2 | 7/2020 | Lee et al. |
| 10,777,566 B2 | 9/2020 | Lue |
| 10,783,963 B1 | 9/2020 | Hung et al. |
| 10,790,023 B2 | 9/2020 | Harari |
| 10,790,828 B1 | 9/2020 | Gunter et al. |
| 10,825,510 B2 | 11/2020 | Jaiswal et al. |
| 10,860,682 B2 | 12/2020 | Knag et al. |
| 10,880,994 B2 | 12/2020 | Aoki et al. |
| 10,910,393 B2 | 2/2021 | Lai et al. |
| 10,942,673 B2 | 3/2021 | Shafiee Ardestani et al. |
| 10,957,392 B2 | 3/2021 | Lee et al. |
| 11,069,704 B2 | 7/2021 | Lai et al. |
| 11,127,108 B2 | 9/2021 | Sharma et al. |
| 11,171,115 B2 | 11/2021 | Manipatruni et al. |
| 11,410,028 B2 | 8/2022 | Crill et al. |
| 11,443,407 B2 | 9/2022 | Sharma et al. |
| 11,704,211 B1 * | 7/2023 | Kaplan ............... G06F 11/1666 714/6.13 |
| 12,086,410 B1 * | 9/2024 | Mathuriya ......... H01L 23/5384 |
| 2001/0055838 A1 | 12/2001 | Walker et al. |
| 2002/0028541 A1 | 3/2002 | Lee et al. |
| 2003/0122181 A1 | 7/2003 | Wu |
| 2005/0088878 A1 | 4/2005 | Eshel |
| 2005/0280061 A1 | 12/2005 | Lee |
| 2005/0287793 A1 | 12/2005 | Blanchet et al. |
| 2007/0158736 A1 | 7/2007 | Arai et al. |
| 2008/0101109 A1 | 5/2008 | Haring-Bolivar et al. |
| 2008/0117678 A1 | 5/2008 | Shieh et al. |
| 2009/0097321 A1 | 4/2009 | Kim et al. |
| 2009/0184360 A1 | 7/2009 | Jin et al. |
| 2010/0172189 A1 | 7/2010 | Itagaki et al. |
| 2010/0182828 A1 | 7/2010 | Shima et al. |
| 2010/0202208 A1 | 8/2010 | Endo et al. |
| 2010/0270593 A1 | 10/2010 | Lung et al. |
| 2011/0018051 A1 | 1/2011 | Kim et al. |
| 2011/0063915 A1 | 3/2011 | Tanaka et al. |
| 2011/0106742 A1 | 5/2011 | Pino |
| 2011/0128791 A1 | 6/2011 | Chang et al. |
| 2011/0140070 A1 | 6/2011 | Kim |
| 2011/0194357 A1 | 8/2011 | Han et al. |
| 2011/0286258 A1 | 11/2011 | Chen et al. |
| 2011/0297912 A1 | 12/2011 | Samachisa et al. |
| 2012/0007167 A1 | 1/2012 | Hung et al. |
| 2012/0044742 A1 | 2/2012 | Narayanan |
| 2012/0112264 A1 | 5/2012 | Lee et al. |
| 2012/0182801 A1 | 7/2012 | Lue |
| 2012/0235111 A1 | 9/2012 | Osano et al. |
| 2012/0254087 A1 | 10/2012 | Visel |
| 2013/0070528 A1 | 3/2013 | Maeda |
| 2013/0075684 A1 | 3/2013 | Kinoshita et al. |
| 2013/0119455 A1 | 5/2013 | Chen et al. |
| 2014/0043898 A1 | 2/2014 | Kuo et al. |
| 2014/0063949 A1 | 3/2014 | Tokiwa |
| 2014/0119127 A1 | 5/2014 | Lung et al. |
| 2014/0149773 A1 | 5/2014 | Huang et al. |
| 2014/0268996 A1 | 9/2014 | Park |
| 2014/0330762 A1 | 11/2014 | Visel |
| 2015/0008500 A1 | 1/2015 | Fukumoto et al. |
| 2015/0170001 A1 | 6/2015 | Rabinovich et al. |
| 2015/0171106 A1 | 6/2015 | Suh |
| 2015/0179661 A1 | 6/2015 | Huo et al. |
| 2015/0199126 A1 | 7/2015 | Jayasena et al. |
| 2015/0331817 A1 | 11/2015 | Han et al. |
| 2015/0340369 A1 | 11/2015 | Lue |
| 2016/0043100 A1 | 2/2016 | Lee et al. |
| 2016/0141299 A1 | 5/2016 | Hong |
| 2016/0141337 A1 | 5/2016 | Shimabukuro et al. |
| 2016/0181315 A1 | 6/2016 | Lee et al. |
| 2016/0232973 A1 | 8/2016 | Jung |
| 2016/0247579 A1 | 8/2016 | Jeda et al. |
| 2016/0308114 A1 | 10/2016 | Kim et al. |
| 2016/0329341 A1 | 11/2016 | Shimabukuro et al. |
| 2016/0336064 A1 | 11/2016 | Seo et al. |
| 2016/0342892 A1 | 11/2016 | Ross |
| 2016/0342893 A1 | 11/2016 | Ross et al. |
| 2016/0343421 A1 | 11/2016 | Pyo |
| 2016/0358661 A1 | 12/2016 | Vali et al. |

(56) References Cited

U.S. PATENT DOCUMENTS

| | | |
|---|---|---|
| 2016/0379115 A1* | 12/2016 | Burger .............. G06F 15/7803 706/25 |
| 2017/0003889 A1 | 1/2017 | Kim et al. |
| 2017/0025421 A1 | 1/2017 | Sakakibara et al. |
| 2017/0084748 A1 | 3/2017 | Yang |
| 2017/0092370 A1 | 3/2017 | Harari |
| 2017/0103316 A1 | 4/2017 | Ross et al. |
| 2017/0123987 A1 | 5/2017 | Cheng et al. |
| 2017/0148517 A1 | 5/2017 | Harari |
| 2017/0160955 A1 | 6/2017 | Jayasena et al. |
| 2017/0169885 A1 | 6/2017 | Tang et al. |
| 2017/0169887 A1 | 6/2017 | Widjaja |
| 2017/0243879 A1 | 8/2017 | Yu et al. |
| 2017/0263623 A1 | 9/2017 | Zhang et al. |
| 2017/0270405 A1 | 9/2017 | Kurokawa |
| 2017/0287928 A1 | 10/2017 | Kanamori et al. |
| 2017/0309634 A1 | 10/2017 | Noguchi et al. |
| 2017/0316833 A1 | 11/2017 | Ihm et al. |
| 2017/0317096 A1 | 11/2017 | Shin et al. |
| 2017/0337466 A1 | 11/2017 | Bayat et al. |
| 2018/0113649 A1 | 4/2018 | Shafiee Ardestani et al. |
| 2018/0121790 A1 | 5/2018 | Kim et al. |
| 2018/0129424 A1 | 5/2018 | Confalonieri et al. |
| 2018/0129936 A1 | 5/2018 | Young et al. |
| 2018/0144240 A1 | 5/2018 | Garbin et al. |
| 2018/0157488 A1 | 6/2018 | Shu et al. |
| 2018/0173420 A1 | 6/2018 | Li et al. |
| 2018/0182776 A1 | 6/2018 | Kim |
| 2018/0189640 A1 | 7/2018 | Henry et al. |
| 2018/0240522 A1 | 8/2018 | Jung |
| 2018/0246783 A1 | 8/2018 | Avraham et al. |
| 2018/0247195 A1 | 8/2018 | Kumar et al. |
| 2018/0285726 A1 | 10/2018 | Baum et al. |
| 2018/0286874 A1 | 10/2018 | Kim et al. |
| 2018/0321942 A1 | 11/2018 | Yu et al. |
| 2018/0342299 A1 | 11/2018 | Yamada et al. |
| 2018/0350823 A1 | 12/2018 | Or-Bach et al. |
| 2019/0019538 A1 | 1/2019 | Li et al. |
| 2019/0019564 A1 | 1/2019 | Li et al. |
| 2019/0035449 A1 | 1/2019 | Saida et al. |
| 2019/0043560 A1 | 2/2019 | Sumbul et al. |
| 2019/0050714 A1 | 2/2019 | Nosko et al. |
| 2019/0065151 A1 | 2/2019 | Chen et al. |
| 2019/0073564 A1 | 3/2019 | Saliou |
| 2019/0073565 A1 | 3/2019 | Saliou |
| 2019/0088329 A1 | 3/2019 | Tiwari et al. |
| 2019/0102170 A1 | 4/2019 | Chen et al. |
| 2019/0138891 A1 | 5/2019 | Kim et al. |
| 2019/0138892 A1 | 5/2019 | Kim et al. |
| 2019/0148393 A1 | 5/2019 | Lue |
| 2019/0164044 A1 | 5/2019 | Song et al. |
| 2019/0164617 A1 | 5/2019 | Tran et al. |
| 2019/0213234 A1 | 7/2019 | Bayat et al. |
| 2019/0220249 A1 | 7/2019 | Lee et al. |
| 2019/0244662 A1 | 8/2019 | Lee et al. |
| 2019/0286419 A1 | 9/2019 | Lin et al. |
| 2019/0311243 A1 | 10/2019 | Whatmough et al. |
| 2019/0311749 A1 | 10/2019 | Song et al. |
| 2019/0325959 A1 | 10/2019 | Bhargava et al. |
| 2019/0340497 A1 | 11/2019 | Baraniuk et al. |
| 2019/0349426 A1 | 11/2019 | Smith et al. |
| 2019/0363131 A1 | 11/2019 | Torng et al. |
| 2020/0026993 A1 | 1/2020 | Otsuka |
| 2020/0034148 A1 | 1/2020 | Sumbul et al. |
| 2020/0065650 A1 | 2/2020 | Tran et al. |
| 2020/0098784 A1 | 3/2020 | Nagashima et al. |
| 2020/0098787 A1 | 3/2020 | Kaneko |
| 2020/0110990 A1 | 4/2020 | Harada et al. |
| 2020/0117986 A1 | 4/2020 | Burr et al. |
| 2020/0118638 A1 | 4/2020 | Leobandung et al. |
| 2020/0143248 A1 | 5/2020 | Liu et al. |
| 2020/0160165 A1 | 5/2020 | Sarin |
| 2020/0227432 A1 | 7/2020 | Lai et al. |
| 2020/0334015 A1 | 10/2020 | Shibata et al. |
| 2020/0343252 A1 | 10/2020 | Lai et al. |
| 2020/0349093 A1 | 11/2020 | Malladi et al. |
| 2020/0365611 A1 | 11/2020 | Hung et al. |
| 2020/0381450 A1 | 12/2020 | Lue et al. |
| 2020/0395309 A1 | 12/2020 | Cheah et al. |
| 2020/0402997 A1 | 12/2020 | Ahn et al. |
| 2021/0168230 A1 | 6/2021 | Baker et al. |
| 2021/0209468 A1 | 7/2021 | Matsumoto et al. |
| 2021/0240945 A1 | 8/2021 | Strachan et al. |
| 2022/0284657 A1* | 9/2022 | Müller ............. G06N 3/084 |
| 2023/0101654 A1* | 3/2023 | Nava Rodriguez .................. G06F 13/1673 345/426 |
| 2023/0153587 A1 | 5/2023 | Vogelsang et al. |
| 2024/0064044 A1* | 2/2024 | Liu ............... H04L 25/024 |

FOREIGN PATENT DOCUMENTS

| | | |
|---|---|---|
| CN | 103778468 A | 5/2014 |
| CN | 105718994 A | 6/2016 |
| CN | 105789139 A | 7/2016 |
| CN | 106530210 A | 3/2017 |
| CN | 106815515 A | 6/2017 |
| CN | 107368892 A | 11/2017 |
| CN | 107533459 A | 1/2018 |
| CN | 107767905 A | 3/2018 |
| CN | 108268946 A | 7/2018 |
| CN | 110598752 A | 12/2019 |
| EP | 2048709 A2 | 4/2009 |
| IN | 107077879 A | 8/2017 |
| JP | H0451382 A | 2/1992 |
| JP | 2006127623 A | 5/2006 |
| JP | 2009080892 A | 4/2009 |
| TW | 201108230 A | 3/2011 |
| TW | 201523838 A | 6/2015 |
| TW | 201618284 A | 5/2016 |
| TW | 201639206 A | 11/2016 |
| TW | 201715525 A | 5/2017 |
| TW | 201732824 A | 9/2017 |
| TW | 201741943 A | 12/2017 |
| TW | 201802800 A | 1/2018 |
| TW | 201807807 A | 3/2018 |
| TW | 201822203 A | 6/2018 |
| TW | 201939717 A | 10/2019 |
| TW | 202004573 A | 1/2020 |
| TW | 202011285 A | 3/2020 |
| TW | 202046179 A | 12/2020 |
| TW | 202103307 A | 1/2021 |
| TW | 202122994 A | 6/2021 |
| TW | 202129509 A | 8/2021 |
| WO | 2012009179 A1 | 1/2012 |
| WO | 2012015450 A1 | 2/2012 |
| WO | 2016060617 A1 | 4/2016 |
| WO | 2016084336 A1 | 6/2016 |
| WO | 2017091338 A1 | 6/2017 |
| WO | 2018201060 A1 | 11/2018 |

OTHER PUBLICATIONS

Anonymous, "Data in the Computer", May 11, 2015, pp. 1-8, https://web.archive.org/web/20150511143158/https:// homepage.cs.uri.edu/faculty/wolfe/book/Readings/Reading02.htm (Year. 2015)—See Office Action dated Aug. 17, 2020 in U.S. Appl. No. 16/279,494 for relevance—no year provided by examiner.

Aritome, et al., "Reliability issues of flash memory cells," Proc. of the IEEE, vol. 81, No. 5, May 1993, pp. 776-788.

Beasley, "Manufacturing Defects," may be found at https://slideplayer.com/slide/11407304, downloaded May 20, 2020, 61 pages.

Chen et al., "A Highly Pitch Scalable 3D Vertical Gate (VG) NAND Flash Decoded by a Novel Self-Aligned Independently Controlled Double Gate (IDG) StringSelect Transistor (SSL)," 2012 Symp. on VLSI Technology (VLSIT), Jun. 12-14, 2012, pp. 91-92.

Chen et al., "Eyeriss: An Energy-Efficient reconfigurable accelerator for deep convolutional neural networks," IEEE ISSCC, Jan. 31-Feb. 4, 2016, 3 pages.

Choi et al., "Performance Breakthrough in NOR Flash Memory with Dopant-Segregated Schottky-Barrier (DSSB) SONOS Device",

(56) References Cited

OTHER PUBLICATIONS

2009 Symposium onVLSI Technology Digest of Technical Papers, Jun. 16-18, 2009, pp. 1-2.

Entegris FAQ Series, "Contamination Control in Ultrapure Chemicals and Water: Fundamentals of Contamination Control," may be found at https://www.entegris.com/en/home/resources/technical-information/faq/contamination-control-in-ultrapure-chemicals-and-water.html., downloaded May 20, 2020, 10 pages.

Fukuzumi et al. "Optimal Integration and Characteristics of Vertical Array Devices for Ultra-High Density, Bit-Cost Scalable Flash Memory," IEEE Dec. 2007, pp. 449-452.

Gonugondla et al., "Energy-Efficient Deep In-memory Architecture for NAND Flash Memories," IEEE International Symposium on Circuits and Systems (ISCAS), May 27-30, 2018, 5 pages.

Guo et al., "Fast, energy-efficient, robust, and reproducible mixed-signal neuromorphic classifier based on embedded NOR flash memory technology," IEEE Int'l Electron Devices Mtg., San Francisco, CA, Dec. 2-6, 2017, 4 pages.

Hsu et al., "Study of Sub-30nm Thin Film Transistor (TFT) Charge-Trapping (CT) Devices for 3D NAND Flash Application", IEDM 2009 IEEE International, Dec. 7-9, 2009, p. 1-4.

Hubert et al., "A Stacked SONOS Technology, Up to 4 Levels and 6nm Crystalline Nanowires, With Gate-All-Around on Independent Gates (Flash), Suitable for Full 3D Integration," IEEE 2009, Dec. 7-9, 2009, p. 27.6.1-27.6.4.

Hung et al., "A highly scalable vertical gate (VG) 3D NAND Flash with robust program disturb immunity using a novel PN diode decoding structure," 2011 Symp. on VLSI Technology (VLSIT), Jun. 14-16, 2011, pp. 68-69.

IMEC Magazine, Mar. 2018, 35 pages.

Jang et al., "Vertical Cell Array Using TCAT (Terabit Cell Array Transistor) Technology for Ultra High Density NAND Flash Memory," 2009 Symposium on VLSI Technology Digest of Technical Papers, Jun. 16-18, 2009, pp. 192-193.

Johnson et al., "512-Mb PROM With a Three-Dimensional Array of Diode/Antifuse Memory Cells," IEEE Journal of Solid-State Circuits, vol. 38, No. 11, Nov. 2003, pp. 1920-1928.

Jung et al, "Three Dimensionally Stacked NAND Flash Memory Technology Using Stacking Single Crystal Si Layers on ILD and TANOS Structure for Beyond 30nm Node," International Electron Devices Meeting, 2006. IEDM '06, Dec. 11-13, 2006, pp. 1-4.

Katsumata et al., "Pipe-shaped BiCS flash memory with 16 stacked layers and multi-level-cell operation for ultra high density storage devices," 2009 Symp. on VLSI Technology, Jun. 16-18, 2009, 2 pages.

Kim et al. "Novel Vertical-Stacked-Array-Transistor (VSAT) for Ultra-High-Density and Cost-Effective NAND Flash Memory Devices and SSD (Solid State Drive)", Jun. 2009 Symposium on VLSI Technolgy Digest of Technical Papers, pp. 186-187. (cited in parent—copy not provided herewith).

Kim et al., "Multi-Layered Vertical Gate NAND Flash Overcoming Stacking Limit for Terabit Density Storage, "2009 Symposium on VLSI Technology Digest of Technical Papers, Jun. 16-18, 2009, pp. 188-189.

Kim et al., "Novel 3-D Structure for Ultra High Density Flash Memory with VRAT (Vertical-Recess-Array-Transistor) and PIPE (Planarized Integration on the same PlanE)," IEEE 2008 Symposium on VLSI Technology Digest of Technical Papers, Jun. 17-19, 2008, pp. 122-123.

Kim et al., "Three-Dimensional NAND Flash Architecture Design Based on Single-Crystalline STacked ARray," IEEE Transactions on Electron Devices, vol. 59, No. 1, pp. 35-45, Jan. 2012.

Kim, "Abrasive for Chemical Mechanical Polishing. Abrasive Technology: Characteristics and Applications," Book Abrasive Technology: Characteristics and Applications, Mar. 2018, 20 pages.

Lai et al. "Highly Reliable MA BE-SONOS (Metal-Al2O3 Bandgap Engineered SONOS) Using a SiO2 Buffer Layer," VLSI Technology, Systems and Applications 2008, VLSI-TSA International Symposium on Apr. 21-23, 2008, pp. 58-59.

Lai et al., "A Multi-Layer Stackable Thin-Film Transistor (TFT) NAND-Type Flash Memory," Electron Devices Meeting, 2006, IEDM '06 International, Dec. 11-13, 2006, pp. 1-4.

Liu et al., "Parallelizing SRAM Arrays with Customized Bit-Cell for Binary Neural Networks," 55th ACM/ESDA/IEEE Design Automation Conference (DAC), Sep. 20, 2018, 4 pages.

Lue et al., "A Highly Scalable 8-Layer 3D Vertical-Gate (VG) TFT NAND Flash Using Junction-Free Buried Channel BE-SONOS Device", 2010 Symposium on VLSI Technology Digest of Technical Papers, pp. 131-132, Jun. 15-17, 2010.

Lue et al., "A Novel 3D AND-type NVM Architecture Capable of High-density, Low-power In-Memory Sum-of-Product Computation for Artificial Intelligence Application," IEEE VLSI, Jun. 18-22, 2018, 2 pages.

Lue et al., "A Novel Buried-Channel FinFET BE-SONOS NAND Flash with Improved Memory Window and Cycling Endurance", 2009 Symposium on VLSI Technology Digest of Technical Papers, p. 224-225.

Meena, et al., "Overview of emerging nonvolatile memory technologies," Nanoscale Reearch Letters 9:526, Oct. 2, 2014, 34 pages.

Merrikh-Bayat et al., "High-Performance Mixed-Signal Neurocomputing with Nanoscale Flowting-Gate Memory Cell Arrays," in IEEE Transactions on Neural Netowrks and Learning Systems, vol. 29, No. 10, Oct. 2018, pp. 4782-4790.

Minghao Qi, "ECE 695Q Lecture 10: Optical Lithography—Resolution Enhancement Techniques," may be found at https://nanohub.org/resources/15325/watch?resid=24507, Spring 2016, 35 pages.

Nowak et al., "Intrinsic fluctuations in Vertical NAND flash memories," 2012 Symposium on VLSI Technology, Digest of Technical Papers, pp. 21-22, Jun. 12-14, 2012.

Ohzone et al., "Ion-Implanted Thin Polycrystalline-Silicon High-Value Resistors for High-Density Poly-Load Static RAM Applications," IEEE Trans. on Electron Devices, vol. ED-32, No. 9, Sep. 1985, 8 pages.

Paul et al., "Impact of a Process Variation on Nanowire and Nanotube Device Performance", IEEE Transactions on Electron Devices, vol. 54, No. 9, Sep. 2007, p. 2369-2376.

Rincon-Mora, et al., "Bandgaps in the crosshairs: What's the trim target?" IEEE, The Georgia Tech Analog & Power IC Labroator, Oct. 18, 2006, 5 pages.

Rod Nussbaumer, "How is data transmitted through wires in the computer?", Aug. 27, 2015, pp. 1-3, https://www.quora.com/How-is-data-transmitted-through-wires-in-the-computer (Year: 2015)—See Office Action dated Aug. 17, 2020 in U.S. Appl. No. 16/279,494 for relevance—no year provided by examiner.

Sakai et al., "A Buried Giga-Ohm Resistor (BGR) Load Static RAM Cell," IEEE Symp. on VLSI Technology, Digest of Papers, Sep. 10-12, 1984, 2 pages.

Schuller et al., " Neuromorphic Computing: From Materials to Systems Architecture," US Dept. of Energy, Oct. 29-30, 2015, Gaithersburg, MD, 40 pages.

Seo et al., "A Novel 3-D Vertical FG Nand FLASH Memory Cell Arrays Using the Separated Sidewall Control Gate (S-SCG) for Highly Reliable MLC Operation," 2011 3rd IEEE International Memory Workshop (IMW), May 22-25, 2011, 4 pages.

Soudry, et al. "Hebbian learning rules with memristors," Center for Communication and Information Technologies CCIT Report #840, Sep. 1, 2013, 16 pages.

Tanaka et al., "Bit Cost Scalable Technology with Punch and Plug Process for Ultra High Density Flash Memory," VLSI Technology, 2007 IEEE Symposium on Jun. 12-14, 2007, pp. 14-15.

The Nikon eReview, "KLA-Tencor Research Scientist Emphasizes Stochastic Challenges at LithoVision 2018," may be found at https://nikonereview.com/2018/kla-tencor-research-scientist-emphasizes-stochastic-challenges-at-lithovision—Spring 2018, 7 pages.

Wang et al., "Three-Dimensional NAND Flash for Vector-Matrix Multiplication," IEEE Trans. on Very Large Scale Integration Systems (VLSI), vol. 27, No. 4, Apr. 2019, 4 pages.

Wang, Michael, "Technology Trends on 3D-NAND Flash Storage", Impact 2011, Taipei, dated Oct. 20, 2011, found at www.impact.org.tw/2011/Files/NewsFile/201111110190.pdf.

(56) References Cited

OTHER PUBLICATIONS

Webopedia, "DRAM—dynamic random access memory", Jan. 21, 2017, pp. 1-3, https://web.archive.org/web/20170121124008/https://www.webopedia.com/TERM/D/DRAM.html (Year: 2017)—See Office Action dated Aug. 17, 2020 in U.S. Appl. No. 16/279,494 for relevance—no year provided by examiner.

Webopedia, "SoC", Oct. 5, 2011, pp. 1-2, https://web.archive.org/web/20111005173630/https://www.webopedia.com/ TERM/S/SoC.html (Year: 2011)—See Office Action dated Aug. 17, 2020 in U.S. Appl. No. 16/279,494 for relevance—no month provided by examiner.

Webopedia, "volatile memory", Oct. 9, 2017, pp. 1-4, https://web.archive.org/web/20171009201852/https://www.webopedia.com/TERMN/volatile_memory.html (Year: 2017)—See Office Action dated Aug. 17, 2020 in U.S. Appl. No. 16/279,494 for relevance—no year provided by examiner.

Whang, SungJin et al. "Novel 3-dimensional Dual Control-gate with Surrounding Floating-gate (DC-SF) NAND flash cell for 1Tb file storage application," 2010 IEEE Int'l Electron Devices Meeting (IEDM), Dec. 6-8, 2010, 4 pages.

Y.X. Liu et al., "Comparative Study of Tri-Gate and Double-Gate-Type Poly-Si Fin-Channel Spli-Gate Flash Memories," 2012 IEEE Silicon Nanoelectronics Workshop (SNW), Honolulu, HI, Jun. 10-11, 2012, pp. 1-2.

Goplen et al., "Placement of 3D ICs with Thermal and Interlayer via Considerations," 2007 44th ACM/IEEE Design Automation Conference, Jun. 4-8, 2007, pp. 626-631.

Tanaka et al., "Through-Silicon via Interconnection for 3D Integration Using Room-Temperature Bonding," in IEEE Transactions on Advanced Packaging, vol. 32, No. 4, Nov. 2009, pp. 746-753.

Temiz, et al., "Post-CMOS Processing and 3-D Integration Based on Dry-Film Lithography," in IEEE Transactions on Components, Packaging and Manufacturing Technology, vol. 3, No. 9, Sep. 2013, pp. 1458-1466.

\* cited by examiner

HIGH BANDWIDTH NON-VOLATILE MEMORY FOR AI INFERENCE SYSTEM

RELATED APPLICATION

This application is being filed concurrently with commonly owned, commonly invented pending U.S. patent application Ser. No. 18/112,827 (publication U.S. 2024/0281636, titled "DATA OPTIMIZATION FOR HIGH BANDWIDTH (HBW) NVM AI INFERENCE SYSTEM", which is incorporated in its entirety herein for all purposes.

BACKGROUND

Field

The present invention relates to integrated circuit memory devices, such as non-volatile memory devices, that support storage and retrieval of information used in Artificial Intelligence (AI) inferencing applications, and particularly relates to a layered die memory architecture and command decoder to provide high bandwidth storage and retrieval of weights and other information supporting AI inferencing applications.

Description of Related Art

Modern information technology applications, such as artificial intelligence (AI) inferencing can consume copious amounts of data such as weighting information in conduct of inferencing operations.

Many different types of memory architectures have been created, each providing storage of digital data and addressing different needs and requirements of a variety of applications. However, conventional approaches to memory devices often suffer from insufficient bandwidth, leading to poor performance, or require refresh logic and are therefore higher in cost.

It is desirable to provide mechanisms for storing AI inferencing data that are capable of greater bandwidths.

SUMMARY

A high bandwidth non-volatile memory (NVM) is described suitable for providing neural network weight data to an AI accelerator processing core or cores (e.g., accelerator core). An artificial intelligence (AI) inference memory device employing the high bandwidth NVM technology as described herein can comprise a logic layer die including channel logic implementing connections between a plurality of channels for conducting data to and from an accelerator core via a bus and a plurality of non-volatile memory (NVM) dies stacked vertically one above another, forming a layered vertical stack of NVM dies, each of the NVM dies including at least one memory chip and a plurality of direct vertical connections to a corresponding channel in the logic layer.

In a representative implementation, an artificial intelligence (AI) inference memory device, comprises a logic layer die that can include channel logic implementing connections between a plurality of channels for conducting data to and from an accelerator core via at least one bus can be mounted to a substrate. A plurality of non-volatile memory (NVM) dies can be stacked vertically one above another, forming a layered vertical stack of NVM dies. Each of the NVM dies can include at least one memory chip and a plurality of direct vertical connections to a corresponding channel logic in the logic layer. The direct vertical connections can be via-to-via connections of a through silicon via (TSV) integrated circuit. AI inference devices can implement NVMs using any suitable NVM technology such as for example and without limitation a phase change memory (PCM), a three-dimensional cross point memory (3D Xpoint), a NOR flash memory, a resistive random-access memory (RRAM), a magneto-resistive random-access memory MRAM, a ferroelectric random-access memory FeRAM, a conductive bridge random-access memory CBRAM, and a NAND flash memory.

In some implementations, the stacked NVM dies can be organized into one or more banks. A controller in the logic layer can execute interface commands with one or more NVM dies of corresponding banks. Thus, interface commands can be executed by two or more channels in parallel. The interface commands include a read neural network weights data command, and a write neural network weights data command.

In one example implementation, NVM dies are arranged in two stacks of four NVM dies on the logic layer die and provide data to eight parallel channels. Interface commands can be executed by memory corresponding to a plurality of channels in parallel; thereby achieving 50 GB/second throughput to the accelerator core.

In another aspect, the channel logic further includes an interface to a substrate mounting a processor or field programmable gate array (FPGA) that performs neural network computations and a static random-access memory (SRAM) storing activation data for use in neural network computations. Activation data can include for example stored non-linear function(s) for relating relationships between input and output of a neural network, such as for example, a sigmoid function, a hyperbolic tangent (tan h) function, a rectified linear unit (ReLU) function, a leaky rectified linear unit (LReLU) function, and a maxout function. Alternatively, the substrate can mount a processor or a field programmable gate array (FPGA) that performs neural network computations and a dynamic random-access memory (DRAM) storing activation data for use in neural network computations.

In a yet further aspect, the logic layer and vertical stack comprising the plurality of NVM dies can be affixed to an interposer layer. The interposer layer provides connection between the plurality of direct vertical connections of the vertical stack to corresponding channel logic in the logic layer. The AI inference memory device can be packaged as a 2.5D through silicon via (TSV) integrated circuit.

In a still yet further aspect, the logic layer can be affixed to an interposer layer. The plurality of NVM dies are stacked vertically above the logic layer and the interposer layer in a vertical stack; thereby establishing connections between the plurality of direct vertical connections of the vertical stack to corresponding channel logic in the logic layer. The AI inference memory device can be packaged as a three-dimension (3D) through silicon via (TSV) integrated circuit. In some implementations, a plurality of solder bumps that have been deposited onto chip pads of the logic layer and the plurality of NVM dies provide connection with a device immediately below. In some implementations, a plurality of backside interconnects have been deposited onto chip pads of the logic layer and the plurality of NVM dies provide wafer-to-wafer connection with a device above. The AI inference memory device can be packaged as a three-dimensional (3D) system-on-chip (3D SOC) integrated circuit.

In another representative implementation, an artificial intelligence (AI) inference method is provided. The method can be conducted by a processor coupled with a logic layer die including channel logic implementing connections between a plurality of channels conducting data to and from an accelerator core via at least one bus, and a plurality of non-volatile memory (NVM) dies stacked vertically one above another, forming a layered vertical stack of NVM dies, each of the NVM dies including at least one memory chip and a plurality of direct vertical connections to a corresponding channel logic in the logic layer. The method can comprise retrieving from the plurality of NVM dies that are stacked vertically above the logic layer die, a plurality of neural network weights stored therein. Using the accelerator core, the plurality of neural network weights can be applied to input data for each one of a plurality of nodes of a neural network to obtain an intermediate output. Activation data defining an activation function or functions can be applied to the intermediate output to obtain a result for a neural network level. The result can be stored in the plurality of NVM dies, a field programmable gate array (FPGA) buffer, activation memory or any storage device facilitating computations at additional neural network levels until a final result is reached. In embodiments suitable activation data can include stored data implementing an activation function including one or more of a sigmoid function, a hyperbolic tangent (tan h) function, a rectified linear unit (ReLU) function, a leaky rectified linear unit (LReLU) function, and a maxout function. In embodiments, the plurality of NVM dies are arranged in two stacks of four NVM dies on the logic layer die, and wherein the method further comprises providing data to eight parallel channels.

In a further representative implementation, an AI inference system can comprise a processor chip, a first memory chip suitable for storing activation functions, and a second (high bandwidth) memory chip suitable for storing arrays of weights can be coupled together. The processor can apply weights retrieved from the NVM dies to specific inputs and can apply activation functions retrieved from the first memory chip to provide inferencing output. The inference system can be implemented as a multichip module in a single package. The package can be mounted on a circuit board or other type of substrate and connected to sensors and other components that can generate data consumed by the execution of inference processing using the weight data stored in the high bandwidth NVM, and consume data generated by execution of the inference processing.

Other aspects and advantages of the present invention can be seen on review of the drawings, the detailed description, and the claims, which follow.

DETAILED DESCRIPTION

A detailed description of embodiments of the present invention is provided with reference to the FIGS. 1-11.

Figure 1:
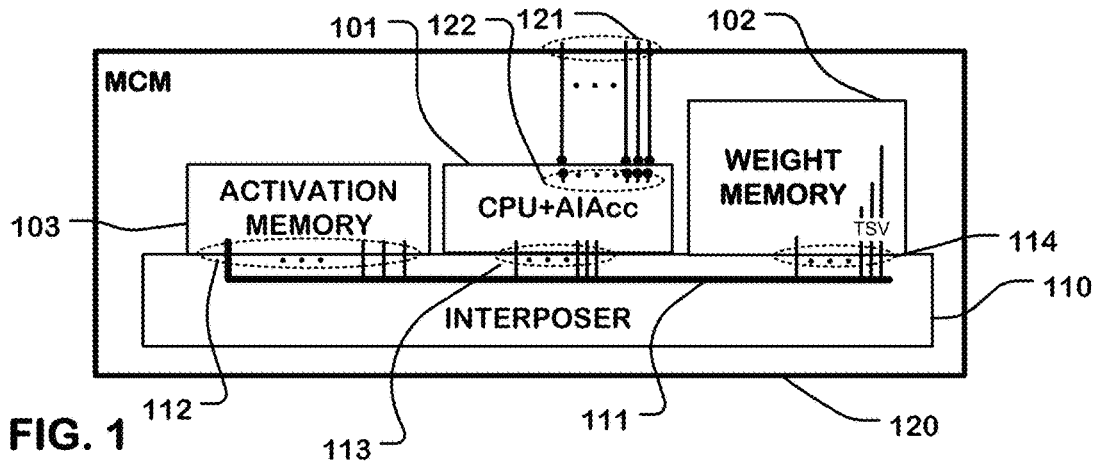
FIG. 1 is an illustration of a multichip module including a high bandwidth memory for AI inferencing as described herein.

FIG. 1 illustrates a multichip module (MCM) 120 that includes a processor chip 101, a first memory chip 103 (e.g., an activation memory storing activation data), and second memory chip 102 (e.g., a weight memory storing weight data for a neural network). The weight memory can be considered high bandwidth (HB) memory. In this example, mounted on an interposer 110 are the processor chip 101, the second memory chip 102, which can be a HB non-volatile memory (NVM) for storing weights (e.g., weight data) used in neural network computations, and the first memory chip 103, which can be dynamic random access memory (DRAM), static random access memory (SRAM) or NAND, however DRAM and SRAM are presently preferred options, for storing activation data for activation functions used in neural network computations. The assembly is configured as a multichip module 120 in a single package.

The processor chip 101 can include a runtime processor core (e.g. CPU) and an accelerator core, such as an artificial intelligence accelerator (e.g. AIAcc) or a neuron processing unit.

In this example, processor chip 101 includes an input/output interface 113 disposed on the surface of the chip 101. The input/output interface 113 is connected to interconnection wiring 111 on the interposer 110.

The first memory chip 103 includes an interface 112 for connection to the interconnection wiring 111 on the interposer 110.

The second memory chip 102 includes an interface 114 for connection to the interconnection wiring 111 on the interposer 110. While depicted as a single entity in FIG. 1 for clarity, second memory 102 can comprise multi-layered stack, in which memory dies are disposed on different layers and can be connected to vertical connectors such as through silicon via (TSV) connections to interconnection wiring 111 on the interposer 110.

Thus, interconnection wiring 111 provides part of the data path between the first memory chip 103, the second memory chip 102, and the processor chip 101.

In the example illustrated in FIG. 1, the processor chip 101 includes another input/output interface 122 for connection to external contact structures 121 of the multichip module 120.

Figure 2:
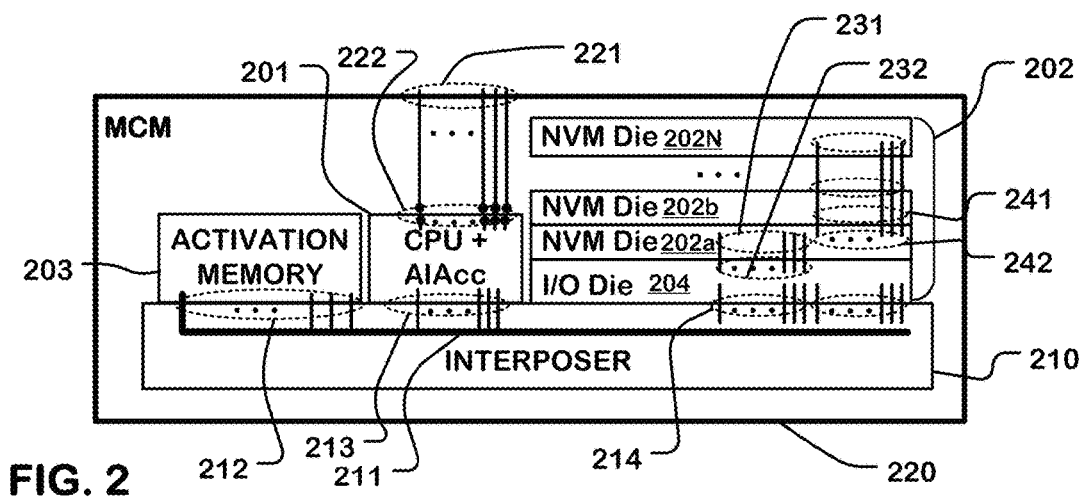
FIG. 2 is an illustration of another embodiment of a multichip module including a high bandwidth memory for artificial intelligence (AI) inferencing as described herein.

FIG. 2 illustrates another configuration of an inference system as described herein. This configuration includes a processor chip 201, a first memory chip 203 (e.g., an activation memory storing activation data), and a second memory chip 202 (e.g., a weight memory storing weight data for a neural network), which can be considered HB memory. In this example, the second memory chip 202 comprises individual layered non-volatile memory (NVM) dies 202a-202N mounted to an I/O die 204 implementing connection logic in a logic layer. The processor chip 201, the I/O die 204 of the second memory chip 202, and the first memory chip 203 are mounted on an interposer 210. The assembly is configured as a multichip module (MCM) 220 in a single package.

The processor chip 201 can include a runtime processor core (e.g. CPU) and an accelerator core, such as an artificial intelligence accelerator (e.g. AIAcc) or a neuron processing unit.

The second memory chip 202 includes the plurality of non-volatile memory dies 202a-202N stacked one on top of another and stacked above the I/O die 204. One such NVM die 202a illustrated includes a chip-to-chip bonding surface on which an interface 231 is exposed for connection to the I/O die 204. The I/O die 204 includes an interface 232 exposed on a surface of the I/O die 204, and complementary to the interface 231 on the NVM die 202a. In this example, direct vertical connections at the surfaces are provided between the memory interface 232 and the interface 231. The direct vertical connections can comprise very short length copper via-to-via conductors or other chip-to-chip contact technologies suitable for high speed, low latency, and low power communication between the chips.

With continuing reference to the second memory chip 202, another NVM die 202b illustrated includes a chip-to-chip bonding surface on which an interface 241 (e.g., an NVM-NVM interface) is exposed for connection to NVM die 202a of the second memory chip 202. The NVM die 202a includes an interface 242 (e.g., an NVM-NVM interface) exposed on a surface of the NVM die 202a, and complementary to the interface 241 on the NVM die 202b. In this example, direct vertical connections at the surfaces are provided between the NVM-NVM interface 242 and the NVM-NVM interface 241.

In some implementations, an interposer layer provides connection between the plurality of direct vertical connections of the vertical stack (e.g., NVM dies 202a-202N) to corresponding channel logic in the logic layer (e.g., I/O die 204). In some implementations, a plurality of solder bumps that have been deposited onto chip pads of the logic layer (e.g., I/O die 204) and the plurality of NVM dies (e.g., 202a-202N) provide connection with a device immediately below. In some implementations, a plurality of backside interconnects have been deposited onto chip pads of the logic layer and the plurality of NVM dies provide wafer-to-wafer connection with a device above. The AI inference memory device can be packaged as any of a 2.5D through silicon via (TSV) integrated circuit, a three-dimension (3D) through silicon via (TSV) integrated circuit and a three-dimensional (3D) system-on-chip (3D SOC) integrated circuit.

In this example, the processor chip 201 includes an input/output interface 213 disposed on the surface of the chip 201. The input/output interface 213 is connected to interconnection wiring 211 on the interposer 210.

The first memory chip 203 includes an interface 212 for connection to the interconnection wiring 211 on the interposer 210.

Also, the I/O chip 204 includes an interface 214 for connection to the interconnection wiring 211 on the interposer 210.

Thus, interconnection wiring 211 provides part of the data path between the first memory chip 203 and the second memory chip 202, and the processor chip 201.

In the example illustrated in FIG. 2, the processor chip 201 includes another input/output interface 222 for connection to external contact structures 221 of the multichip module 220.

Figure 3:
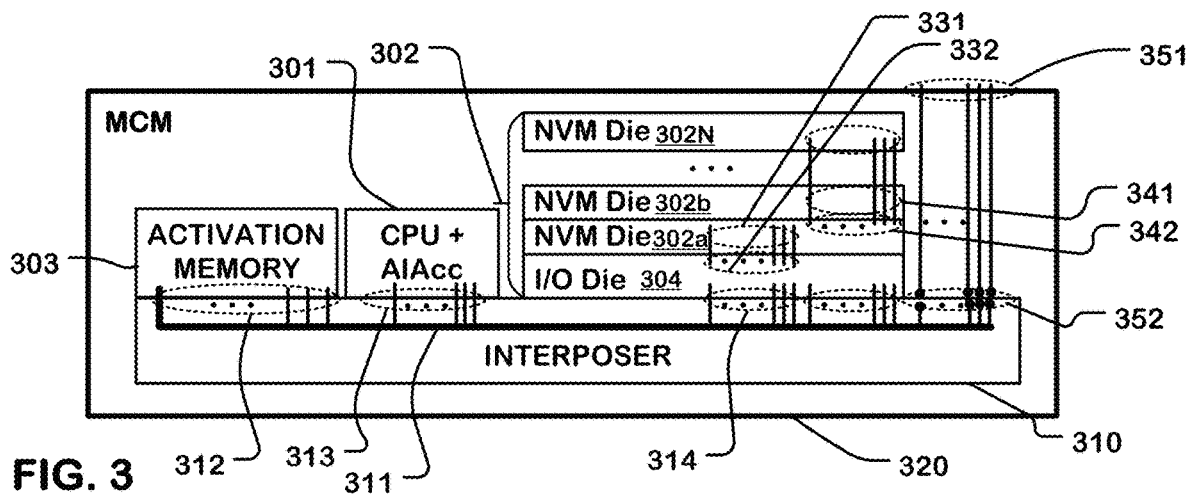
FIG. 3 is an illustration of yet another embodiment of a multichip module including a high bandwidth memory for AI inferencing as described herein.

FIG. 3 illustrates another configuration of an inference system as described herein. This configuration includes a processor chip 301, a first memory chip 303 (e.g., an activation memory storing activation data), and a second memory chip 302 (e.g., weight memory storing weight data for a neural network), which can be considered HB memory. In this example, the second memory chip 302 comprises individual layered non-volatile memory (NVM) dies 302a-302N mounted to an I/O die 304. The processor chip 301, the I/O die 304 of the second memory chip 302, and the first memory chip 303 are mounted on an interposer 310. The assembly is configured as a multichip module (MCM) 320 in a single package.

The processor chip 301 can include a runtime processor core (e.g. CPU) and an accelerator core, such as an artificial intelligence accelerator (e.g. AIAcc) or a neuron processing unit.

The second memory chip 302 includes the plurality of non-volatile memory dies 302a-302N stacked one on top of another and stacked above an I/O die 304. One such NVM die 302a illustrated includes a chip-to-chip bonding surface on which an interface 331 is exposed for connection to the I/O die 304. The I/O die 304 includes an interface 332 exposed on a surface of the I/O die 304, and complementary to the interface 331 on the NVM die 302a. In this example, direct vertical connections at the surfaces are provided between the interface 332 and the interface 331. The direct vertical connections can comprise very short length copper via-to-via conductors or other chip-to-chip contact technologies suitable for high speed, low latency, and low power communication between the chips.

With continuing reference to second memory chip 302, another NVM die 302b illustrated includes a chip-to-chip bonding surface on which an interface 341 (e.g., an NVM-NVM interface) is exposed for connection to NVM die 302a the second memory chip 302. The NVM die 302a includes an interface 342 (e.g., an NVM-NVM interface) exposed on a surface of the NVM die 302a, and complementary to the interface 341 on the NVM die 302b. In this example, direct vertical connections at the surfaces are provided between the NVM-NVM interface 342 and the NVM-NVM interface 341.

In some implementations, interposer layer 310 provides connection between the plurality of direct vertical connections of the vertical stack (e.g., NVM chips 302a-302N) to corresponding channel logic in the logic layer (e.g., I/O die 304). In some implementations, a plurality of solder bumps that have been deposited onto chip pads of the logic layer (e.g., I/O die 304) and the plurality of NVM dies (e.g., 302a-302N) provide connection with a device immediately below. In some implementations, a plurality of backside interconnects have been deposited onto chip pads of the logic layer and the plurality of NVM dies provide wafer-to-wafer connection with a device above. The AI inference memory device can be packaged as any of a 2.5D through silicon via (TSV) integrated circuit, a three-dimension (3D) through silicon via (TSV) integrated circuit and a three-dimensional (3D) system-on-chip (3D SOC) integrated circuit.

In this example, processor chip 301 includes an input/output interface 313 disposed on the surface of the chip 301. The input/output interface 313 is connected to interconnection wiring 311 on the interposer 310.

The first memory chip 303 includes an interface 312 for connection to the interconnection wiring 311 on the interposer 310.

Also, the I/O chip 304 includes an interface 314 for connection to the interconnection wiring 311 on the interposer 310.

Thus, interconnection wiring 311 provides part of the data path between the first memory chip 303 and the second memory chip 302, and the processor chip 301.

In the example illustrated in FIG. 3, the multichip module (MCM) 320 includes another input/output interface 352 for connection to external contact structures 351 of the multichip module 320.

FIGS. 1-3 provide example arrangements of an inference system with high bandwidth NVM as described herein, showing varieties of configurations of the chips and connections among the chips, the interposer and external contacts of the package. Other arrangements can be implemented as suits a particular need.

Figure 4:
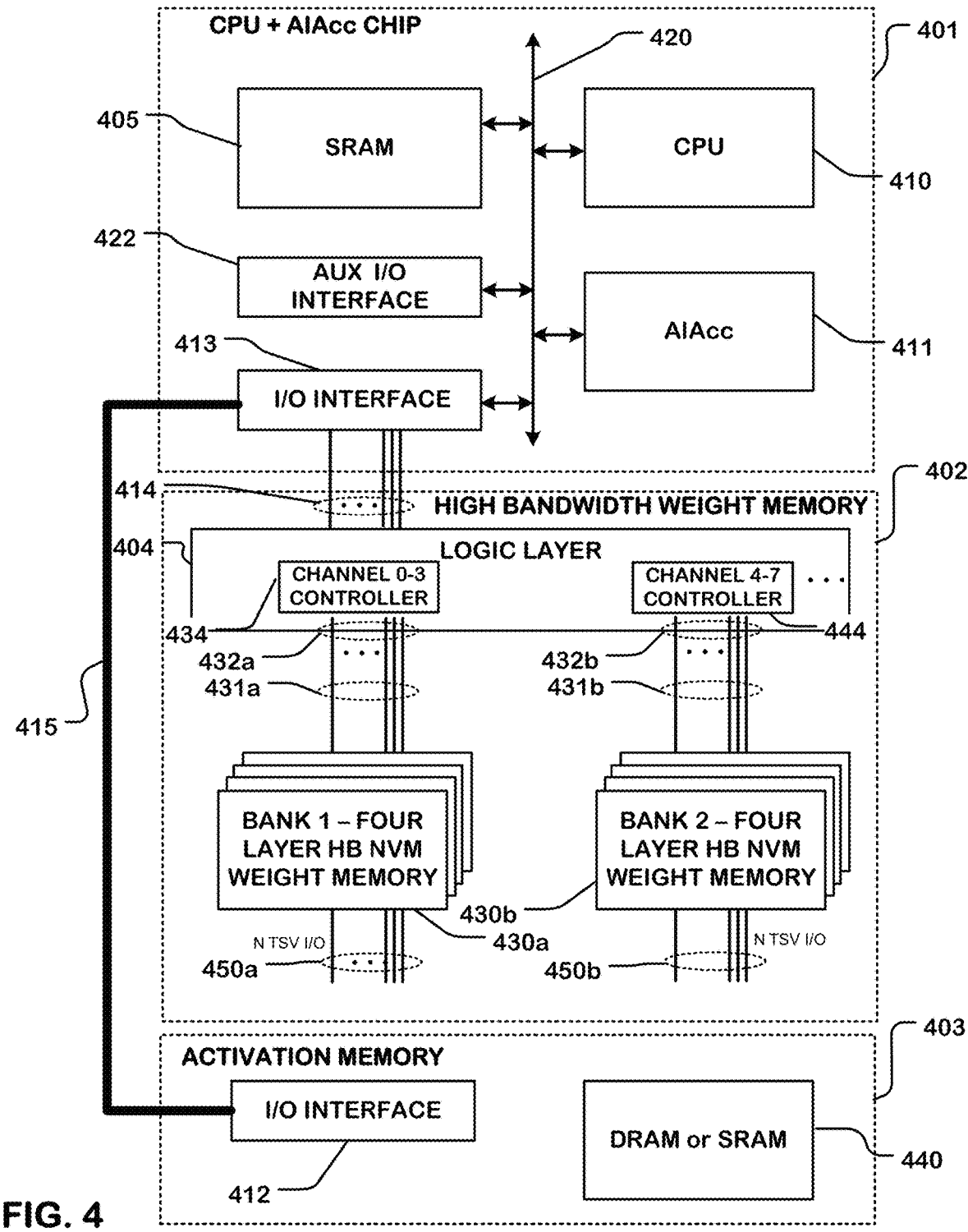
FIG. 4 is a simplified functional block diagram of an inference system as described herein.

FIG. 4 is a simplified functional block diagram of an inference system implemented as described with reference to FIGS. 1-3. The platform includes a processor chip 401 (e.g., a CPU and an AIAcc), a first memory chip 403 (an activation memory storing activation data), and a second memory chip 402 (e.g., a weigh memory storing weight data for a neural network). The processor chip 401 in this example includes a CPU or processor core 410, accelerator core 411, on-chip memory 405, such as SRAM (or other type of memory) which can be used as working memory and as a cache memory, a first I/O interface 413 and a second I/O interface 422. A bus system 420 provides for intra-chip communications among the components of the processor chip 401.

The first memory chip 403 in this example comprises a high capacity, volatile memory 440 such as DRAM or SRAM (or a nonvolatile memory such as 3D NAND or other type of memory implemented using charge trapping storage technology), for example. The first memory chip 403 includes a first memory I/O interface 412 for off-chip communications. The first memory I/O interface 412 can comprise a high-speed serial port, such as a serial peripheral interface (SPI) compatible port, or a parallel port, depending on the particular implementation of the memory chip 403 that is utilized. A data path 415 is provided in this example between the first memory I/O interface 412, and the first I/O interface 413 on the processor chip 401.

The second memory chip 402, in this example, comprises a high-bandwidth (HB), nonvolatile memory (NVM) configured in one or more banks 430a, 430b, each of which can comprise one or more layers of NVM dies arranged in channels. The NVM can be one of a phase change memory (PCM), a three-dimensional cross point memory (3D Xpoint), and a NAND flash memory. In other examples, the second memory chip 402 can comprise NOR flash memory using charge trapping storage technology, or other suitable random-access technologies like resistive RAM (e.g. metal oxide memory), magnetic RAM, Ferroelectric RAM a conductive bridge random-access memory CBRAM and so on.

The second memory chip 402 includes a memory I/O interface 414 for off-chip communications via a logic layer 404 to the I/O interface 413 on the processor chip 401. Logic layer 404 includes channel controllers 434, 444 that provide control of multiple channels forming one or more sets of high-speed data pathways on which weight data can flow across an interface 432a, 432b exposed on a surface of the logic layer 404, and complementary to the interface 431a, 431b on a surface of banks 430a, 430b of NVM dies arranged in layers direct connected by vertical connections 450a, 450b at the surfaces provided between the IO-memory interface 432a, 432b and the memory-IO interface 431a, 431b. The direct vertical connections 450a, 450b can comprise very short length copper via-to-via conductors or other chip-to-chip contact technologies suitable for high speed, low latency, and low power communication between the chips. In an implementation and by way of example, two stacks are formed by stacking four NVM dies with N/8 through silicon via (TSV) I/O per die onto a logic die; wherein N is the total number of TSV IO, and 8 is number of dies; N/8 is IO per die. One NVM die has one channel; one channel is N/8 through silicon via (TSV) I/O. Each channel is completely independent so each channel can operate independently. One controller can control multiple channels. An external controller can be provided in a field programmable gate array (FPGA) or system on a chip (SoC) die (e.g., implementing processor 401).

DRAM is an option to bond into the system in package (SiP) in case on-chip SRAM is not big enough.

Thermal (heat) management can used to guarantee data retention.

An AI accelerator (e.g. accelerator core 411), as the term is used herein, is a configurable logic circuit including components designed or suitable for execution of some or all of the arithmetic operations of AI inference operations. Configuration of the accelerator core can include loading a set of weights from memory 402 to be used in conducting inference operations, or parts of the set of weights. In some embodiments, configuration of the accelerator core can include loading some or all of the of the computation graphs of an inference model that define the sequence and architecture of the operation of the inference model. The inference model can comprise a computation graph of a deep learning neural network, in some examples having a plurality of fully connected and partially connected layers, activation functions, normalization functions and so on.

An accelerator core can be implemented using configurable logic, like arrays of configurable units used in field programmable gate arrays for example, in which compiled computation graphs are configured using bit files. An accelerator core can be implemented using a hybrid of data flow configurable logic and sequential processing configurable logic.

A runtime processor core (e.g. CPU 410) can execute a runtime program to coordinate operation of the accelerator core to accomplish real time inference operations, including data input/output operations, loading computation graphs, moving the set of weights to be applied in the inference operation into and out of the accelerator core, delivering input data to the accelerator core, and performing parts of the computations to obtain inference results.

Figure 5:
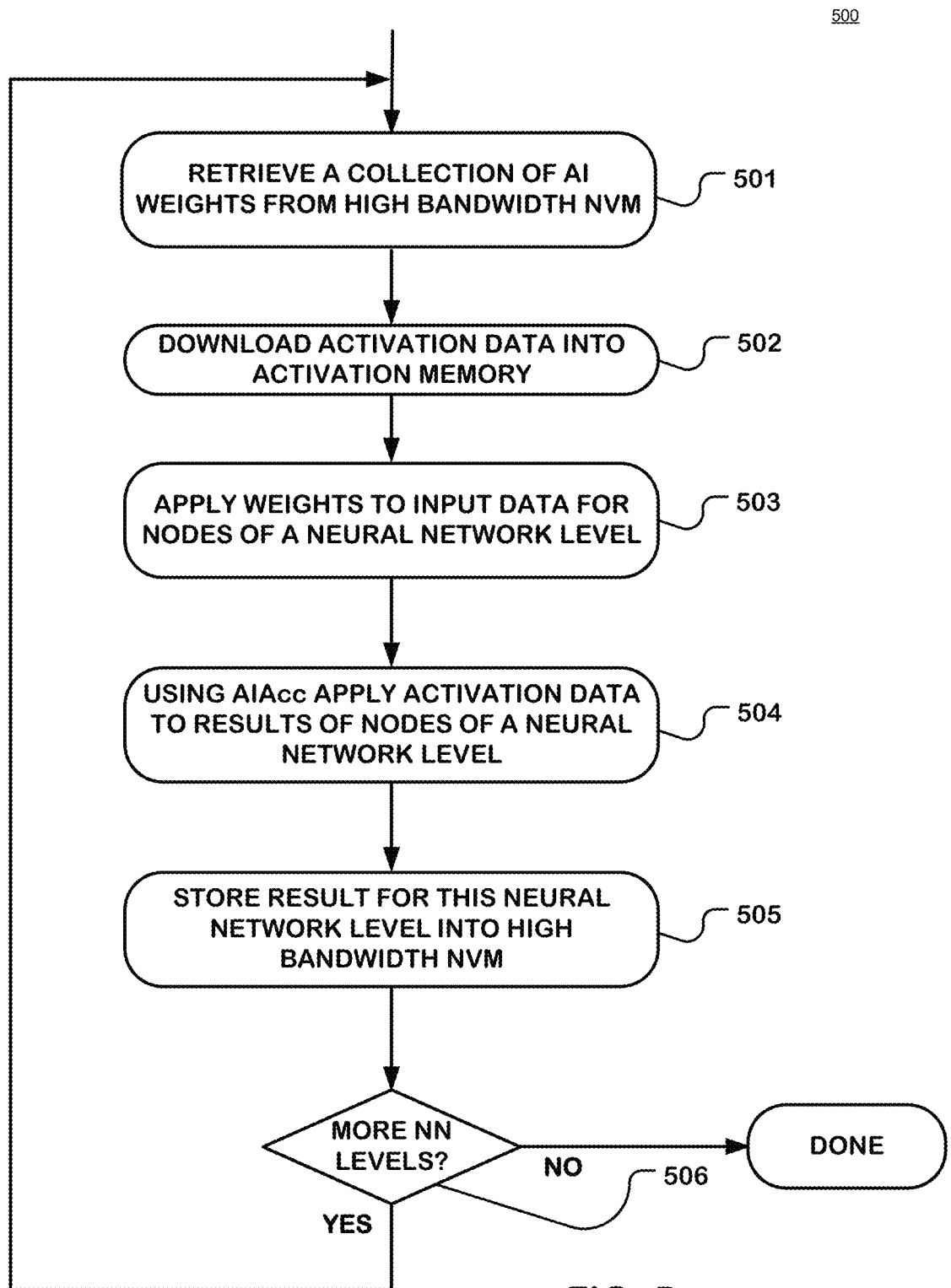
FIG. 5 is a flowchart of a runtime procedure which can be executed by an inference system as described herein.
Figure 6:
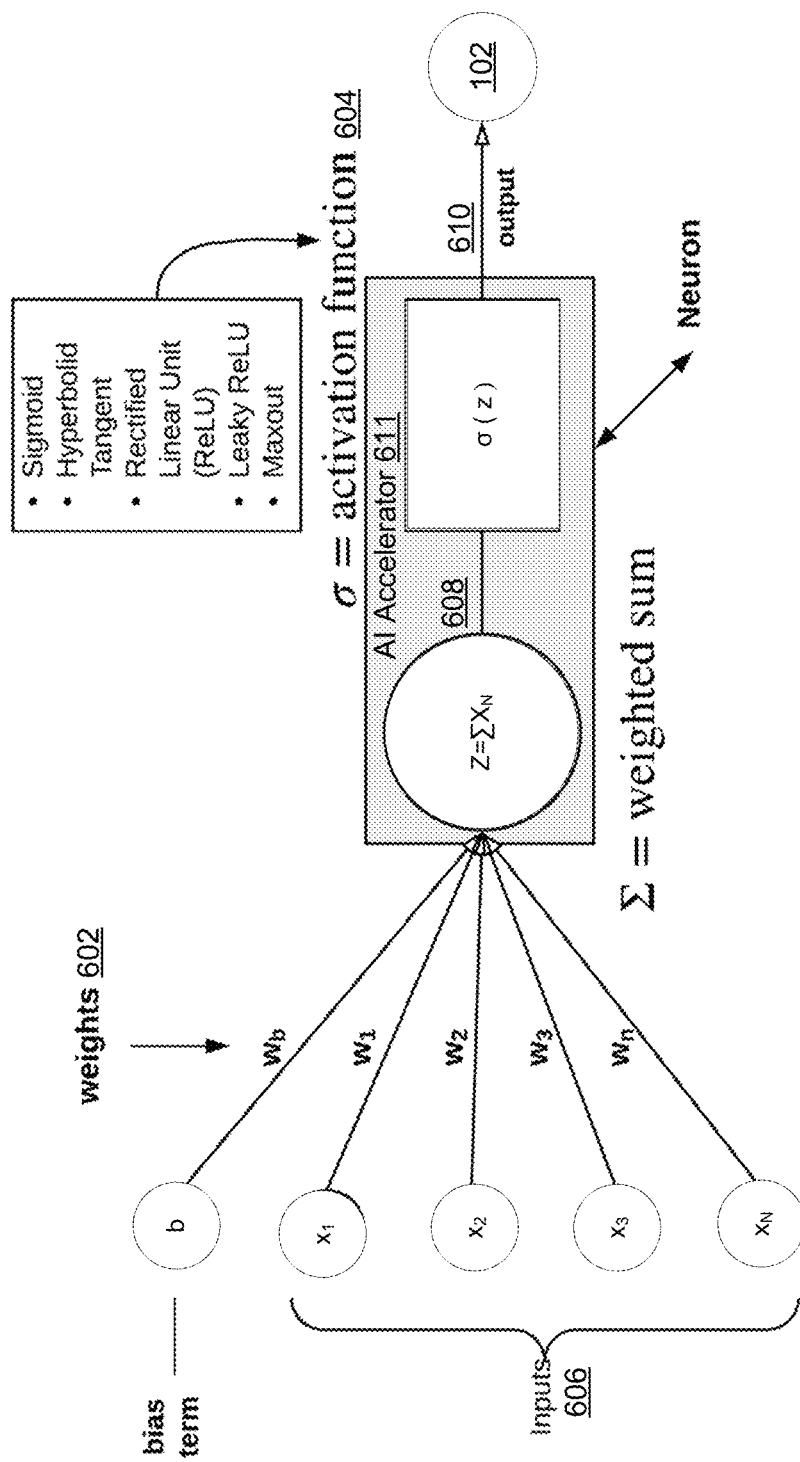
FIG. 6 is a simplified functional block diagram of a representative neural network node (neuron) processed by the AI inference system as described herein.

FIG. 5 is a flowchart illustrating an example of logic of operations executed by an inference system, such as described with reference to FIGS. 1-4. FIG. 6 is a simplified functional block diagram of a representative neural network node (neuron) processed by the AI inference system logic as described herein. The logic can be implemented using machine executable instructions stored in memory, such as the SRAM on-chip memory 405, or other memory accessible by the processor 410 coupled with a logic layer die including channel logic implementing connections between a plurality of channels conducting data to and from an accelerator core via at least one bus, and a plurality of non-volatile memory (NVM) dies stacked vertically one above another, forming a layered vertical stack of NVM dies, each of the NVM dies including at least one memory chip and a plurality of direct vertical connections to a corresponding channel logic in the logic layer. In this example, a collection of weights for artificial intelligence neural network computations downloaded from an external source, such as a network, is loaded into the high bandwidth NVM of the inference system.

Figure 7:
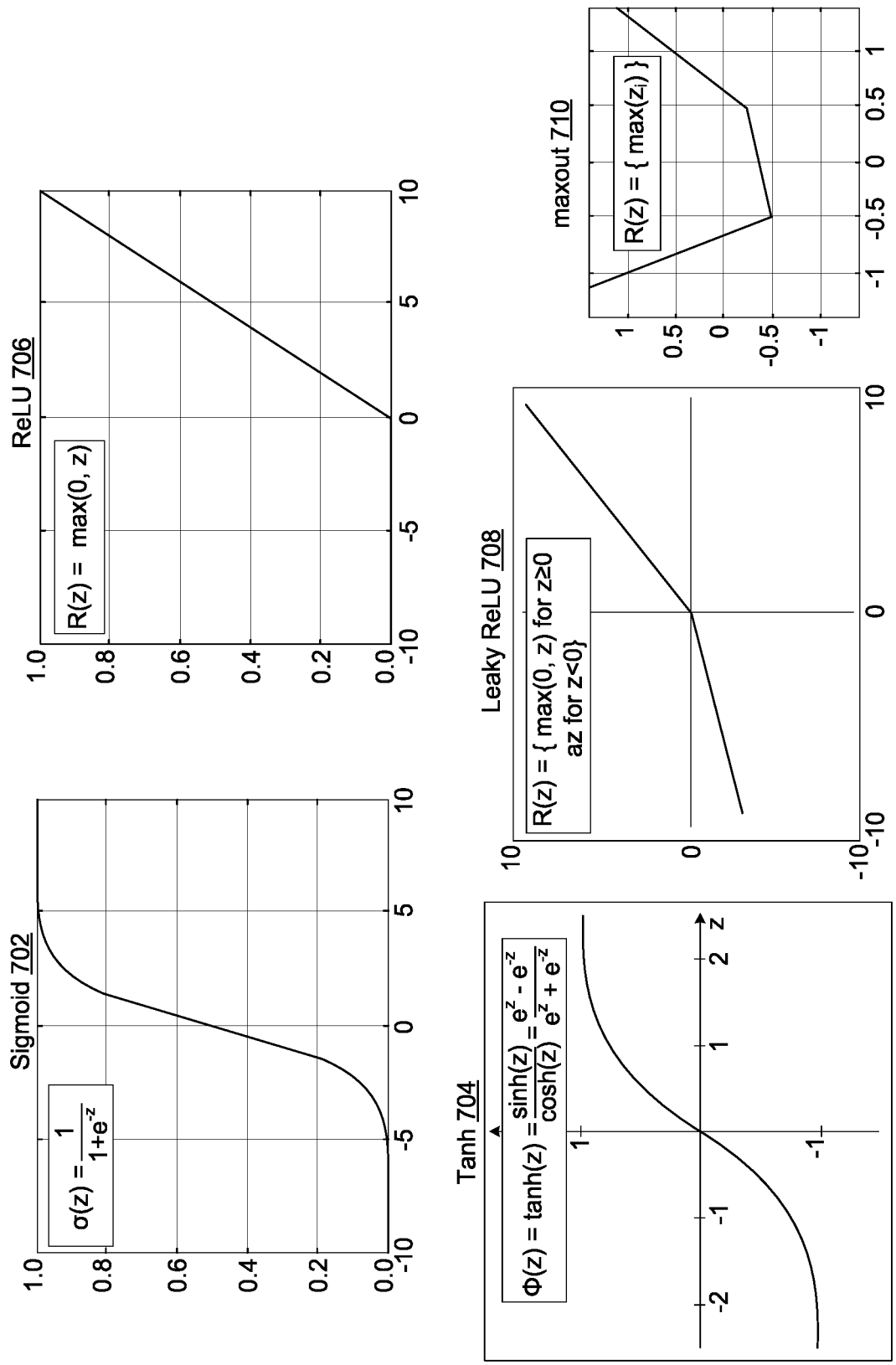
FIG. 7 illustrates representative activation functions suitable for implementing artificial intelligence inferencing as described herein.

With reference to FIGS. 5, 6, and 7, during runtime, an operation retrieves a plurality of neural network weights 602 (e.g., $W_b$, $W_1$, $W_2$, $W_3$, and $W_n$) stored in the high bandwidth NVM (operation 501). The weight data is directly transferred into the AI accelerator core 611 to perform calculations. An activation function 604 is stored in activation memory (e.g., 403 of FIG. 4) (operation 502). With reference to FIG. 7, suitable activation data can include stored data implementing an activation function including one or more of a sigmoid function 702, a hyperbolic tangent (tan h) function 704, a rectified linear unit (ReLU) function 706, a leaky rectified linear unit (LReLU) function 708, and a maxout function 710.

After loading the weights and configuring the AI accelerator core 611, the operations includes executing an inference procedure using the AI accelerator core 611 to apply the plurality of neural network weights to input data 606 for each one of a plurality of nodes of a neural network to obtain an intermediate output (operation 503) for one or more levels of nodes of the neural network. The intermediate output 608 comprises a set of computational results from a level of the neural network.

Next, the activation function 604 stored in, for example the first memory chip 103 (e.g., activation memory 403 of FIG. 4) is applied to the intermediate output to obtain an output 610 (e.g., a result) for one or more levels of the neural network (operation 504). For example, in operation 504, the AIAcc can apply activation data to results of nodes of a level of a neural network. The result is stored in the high bandwidth NVM, FPGA buffer or any storage device, or activation memory 403 (operation 505). The procedure includes checking if nodes at further neural network levels are to be processed (operation 506) and if so, restarting operations 501-506 for the next batch of neural network nodes to be processed. If there are no further levels to process then the output is provided directly and/or stored (e.g., for storage back in second memory 102, FPGA buffer or any storage device).

Thus, the operations of FIG. 5 include an operation to select activation data and weights stored in the first and second memory chips, into the accelerator core, and to execute the neural network nodes using the weights and activation data. Also, as shown in FIG. 5, after executing or beginning to execute the selected neural network nodes, the operations loop to operation 501, to process a next level of the neural network. If more neural network nodes are to be processed, the operations 501 to 506 are traversed, and can include changing the activation data to a different function, loading the weights for the nodes of the next neural network level, and executing the different nodes.

It will be appreciated with reference to FIG. 5, that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

During training processing, weights stored in NVM dies (e.g., of the weights memory 402) are adjusted by the processor chip 401 (e.g., a CPU and an AIAcc) based upon training dataset(s). As training progresses, the processor chip 401 will keep updating values for the weights and this value will be stored in the NVM. In some implementations, weights are fixed during inference processing.

In process constrained environments, speed in which the AI application arrives at a result becomes an important factor. Thus conventional randomly stored weight data in the HBW NAND flash could increase data fetching operations required and lead to low data transmission efficiency due to the page-level granularity inherent to NAND flash page read operations. Weight data storage paradigms in accordance with embodiments described herein can reduce flash access times and increase data process efficiency.

Figure 8:
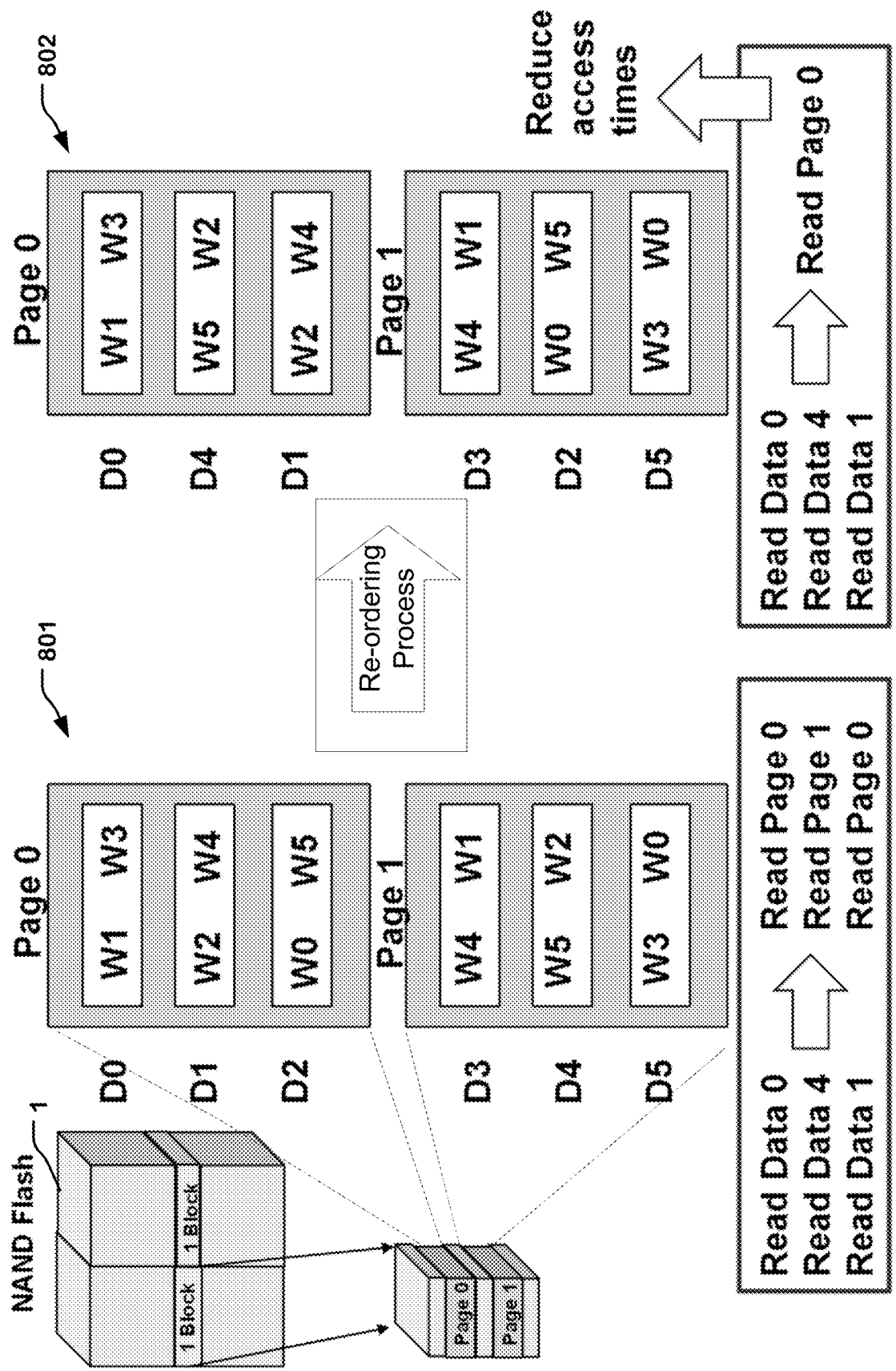
FIG. 8 is a simplified diagram illustrating storage and retrieval of weight data in a memory system including a flash memory device implemented on an integrated circuit as described herein.

FIG. 8 is a simplified diagram illustrating storage and retrieval of weight data used to compute node values during inferencing operations conducted by a neural network in a memory system including a flash memory device 1 implemented on an integrated circuit as described herein. The memory device can be implemented on a single integrated circuit chip, on a multichip module, or on a plurality of chips configured to suit a particular need.

As shown in FIG. 8, memory device 1 is a NAND flash in which read operations are performed at a one-page granularity, meaning that every time a fetch operation for data is performed, one whole page must be read from the flash. Data fetching can become slow when data is stored in different pages. This may impact the process speed of the entire AI inferencing platform. Further, the AI accelerator may stall and wait for data to arrive. This can result in low bandwidth utilization if locality of the data is not well preserved.

Continuing with FIG. 8, D0 to D5 indicate data storage locations; W0 to W5 indicate weight data. The weight data was stored in the NVM. In a first scenario 801, weight data (i.e., neural network weights) are stored randomly in data locations from location D0 to location D5 in page 0 and page 1. Accordingly, if neural network processing calls for Data 0, Data 4, and Data 1, e.g., weights W1 and W3, W5 and W2 and W2 and W4, to perform a calculation, i.e., obtain a node value or set of node values, then the NAND flash memory device 1 will read page 0 first, in order to obtain Data 0, e.g., weights W1 and W3, then read page 1, in order to obtain Data 4, e.g., weights W5 and W2, and then go back to re-read page 0, in order to obtain Data 1, e.g., weights W2 and W4. However, if the data is stored in data locations in accordance with an expected retrieval indicated by the neural network to be processed, or re-ordered to be in such storage locations, as illustrated by second scenario 802, expected data acquisition times can be reduced. In second scenario 802, weights belonging to Data 0, Data 4 and Data 1, e.g., (W1, W3), (W5, W2), and (W2, W4) respectively, are all stored in locations in page 0. Thus, obtaining weights belonging to Data 0, Data 4 and Data 1 calls for the NAND flash memory device 1 to perform a single read of page 0, which reduces access time, increases efficiency, increases performance, etc. In various implementations, the structure of the neural network, which indicates which weights are to be used and in what order, can be received as an input by the AI inferencing system, read from storage, or otherwise made accessible. Because the whole neural network structure can be obtained from a local storage on chip, received from a host or another chip in the AI inferencing system, the AI inferencing system can determine what weight data needs to be input during AI inference, and thus in what order the weight data can be stored in order to reduce access times during later inferencing.

Figure 9:
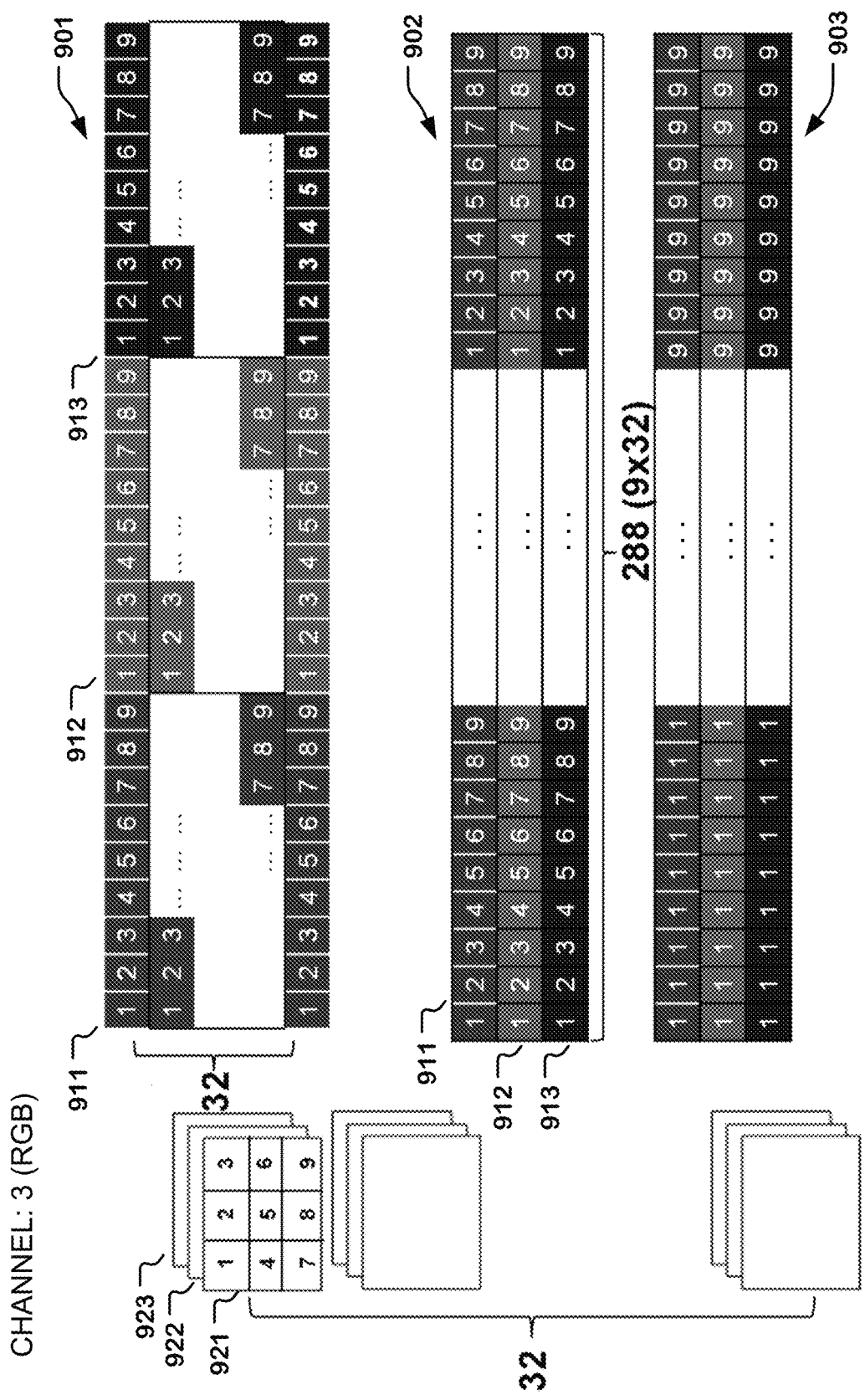
FIG. 9 illustrates weight data used by a neural network to process images being stored according to various storage paradigms by a high bandwidth non-volatile memory (NVM) in accordance with the technologies as described herein.

FIG. 9 illustrates weight data used by a neural network to process images being stored according to various storage paradigms by a high bandwidth NVM in accordance with the technologies as described herein. In the example implementation illustrated by FIG. 9, weight data is stored in the same page or multiple pages in the NVM and read in groups or sets of nine (9) weights for each of three (3) color neural network channels: red (1 to 9), green (1 to 9) and blue (1 to 9). A group (or set) of weights can comprise a filter or a feature map such that the filter can include weights that correspond to network nodes in a layer of the neural network defined in a neural network definition.

In the example storage paradigms 901, 902, 903 illustrated by FIG. 9, there are 32 sets of 9 weights, each having a specific storage location, where a set of 9 weights 911, 912, 913 forms a respective 3×3 filter, e.g., 921, 922, 923. A set of 9 red weights 911 can be used to populate a red filter 921, a set of green weights 912 can be used to populate a green filter 922, and a set of blue weights 913 can populate a blue filter 923. Accordingly, there are 288 red weights (e.g., 32×9), 288 green weights and 288 blue weights. In sum, there is a total of 864 weights (288×3).

As depicted in FIG. 9, weights are stored from left to right in the diagram, which is from red to green to blue in paradigm 901. Accordingly, in paradigm 901, 3 fetch instances are needed to retrieve the first filter of 3 different, i.e., red, green, and blue channels, because, for example, this data might not be stored in the same page in memory, depending on the page size. Accordingly, for example, to populate each of the filters at least 96 read operations (32×3) will be required. If the weights are all stored in the same page, this processing can still require 3 read operations to obtain values for a filter for 3 different (e.g., R, G, and B) channels. That's why the order of the data can be re-arranged so that an AI inferencing engine can process all of the red data at once, if one page is large enough to hold all red data. If the page size is not large enough to hold the weights for all filters of the same color, the remainder of the same color weights will be stored continuing onto the next page in memory.

When the weight data is stored according to a first storage paradigm 901, resulting read processing that is of lower efficiency may result. If data location can be arranged (or re-arranged) and stored in a different ordering, such as paradigms 902, 903, then weight data can be read in once for red, green and blue filters. This will reduce data fetching times, resulting in decreased processing time during inferencing when the data needs to be read.

In paradigm 902, 9 weights for a red filter 911, 9 weights for a green filter 912 and 9 weights for a blue filter 913 have been stored together. In this configuration, a read operation can obtain weights to populate filters 921, 922, and 923 in a single read operation.

In paradigm 903, weights are arranged with all 1s grouped together, then all 2s grouped together, and so forth. This is another data re-arrangement to improve access when performing convolution processing. The input image will multiply 3×3 filter to do convolution processing.

Of course, while 3×3 filters are used in this example illustrated by FIG. 9, filters could be constructed having practically any size, such as for example and without limitation embodiments that implement filters of 5×5, 8×8, in which cases, there would be 25, or 64, etc. total weight values per filter.

Figure 10:
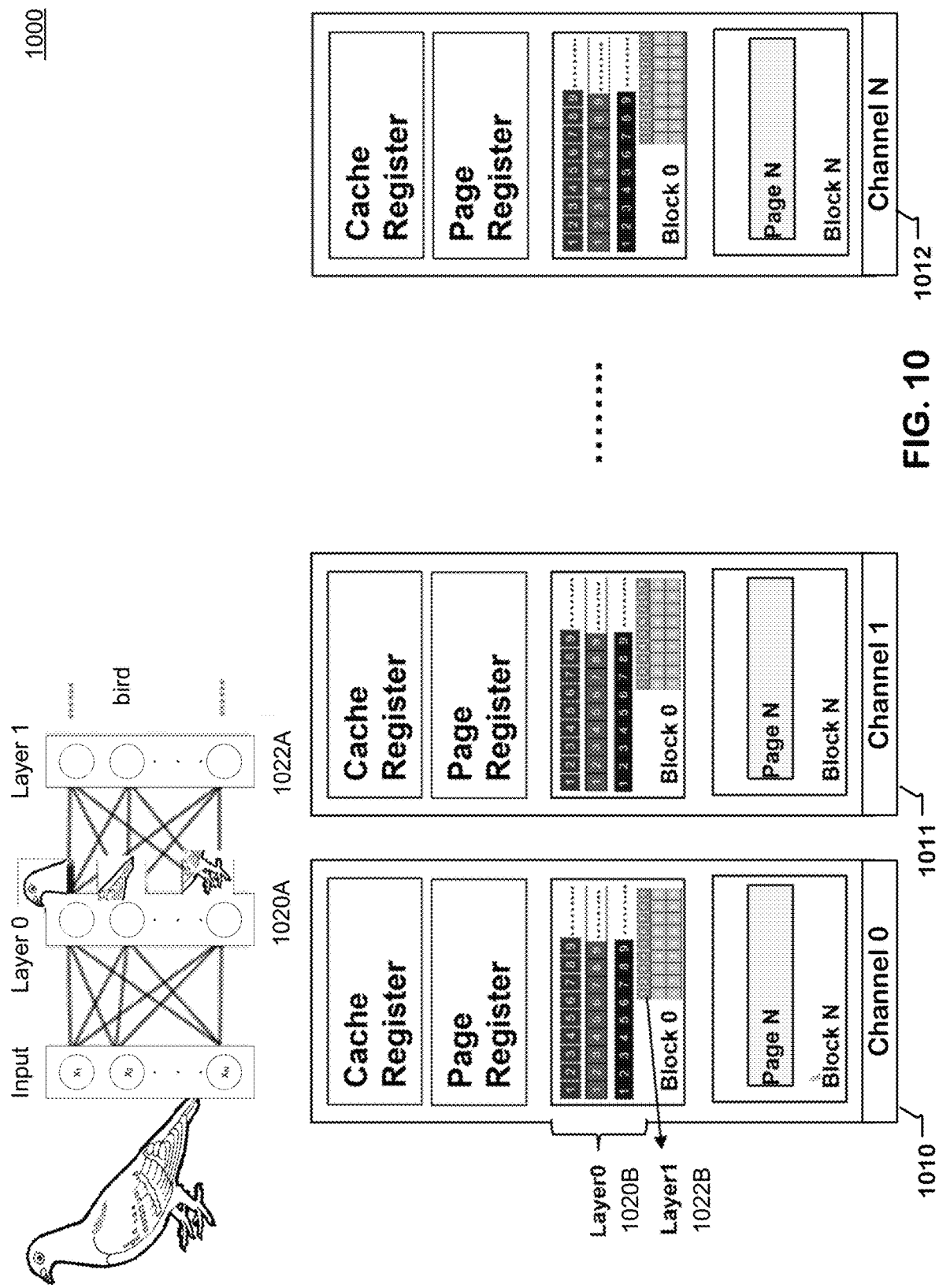
FIG. 10 is a schematic illustration of a technique of allocating weight data among multiple NVM channels by a high bandwidth NVM in accordance with the technologies as described herein.

FIG. 10 is a schematic illustration of a technique of allocating weight data among multiple NVM channels by a high bandwidth NVM in accordance with the technologies as described herein. High bandwidth memory architecture 1000 illustrated by FIG. 10 incorporates the use of channels 1010, 1011, 1012 to enable data to be read from or stored to different NVM dies carrying memory arrays contemporaneously. Such memory channels used for data transfer along pathways to and from dies implementing non-volatile storage arrays. In some implementations, the controller can be shared by, i.e., can control, multiple channels as illustrated by 434, 444 in FIG. 4, which control channels 0-3 and channels 4-7 respectively.

In an implementation and by way of example, if a memory system has 4 channels, or multichannel NVM memory, the total weight data length can be distributed equally or otherwise among the memory channels (data length/channel). Of course, utilization of page size can be maximized using the techniques described above with reference to FIGS. 8-9. For example: 288 weights per neural network channel, e.g., 288 red weights (e.g., 32 filters×9 weights per filter), can be distributed among 4 memory channels, yielding 72 red weights per each memory channel, or 72 red weights/9 weights per filter yields 8 red filters per memory channel. Analogously, 8 green filters per memory channel; and 8 blue filters per memory channel.

Further, different layers of the neural network will employ different groups of weights. As shown in FIG. 10, for example, in the convolutional neural network (CNN), there are different layers 1020A, 1022A. For each layer, there are different filters 1020B, 1022B. Here, layer 0 is the first layer 1020A in convolutional neural network and corresponds to the first layer filter (weights) 1020B are stored in the page 0. If page 0 is not large enough, the weights data will be stored at a following page. Further, weights can be of a different type, and function for the different layers. For example, weights associated with layer 0 1020B include weights grouped according to red, green and blue filters. Layer 1 1022A includes weights grouped according to some other paradigm defined by the neural network definition. In some implementations, the weights corresponding to a first layer of a neural network can be stored according to one paradigm (e.g., 901, 902, or 903 of FIG. 9) and weights corresponding to a second layer of the neural network can be stored according to a different paradigm.

Figure 11:
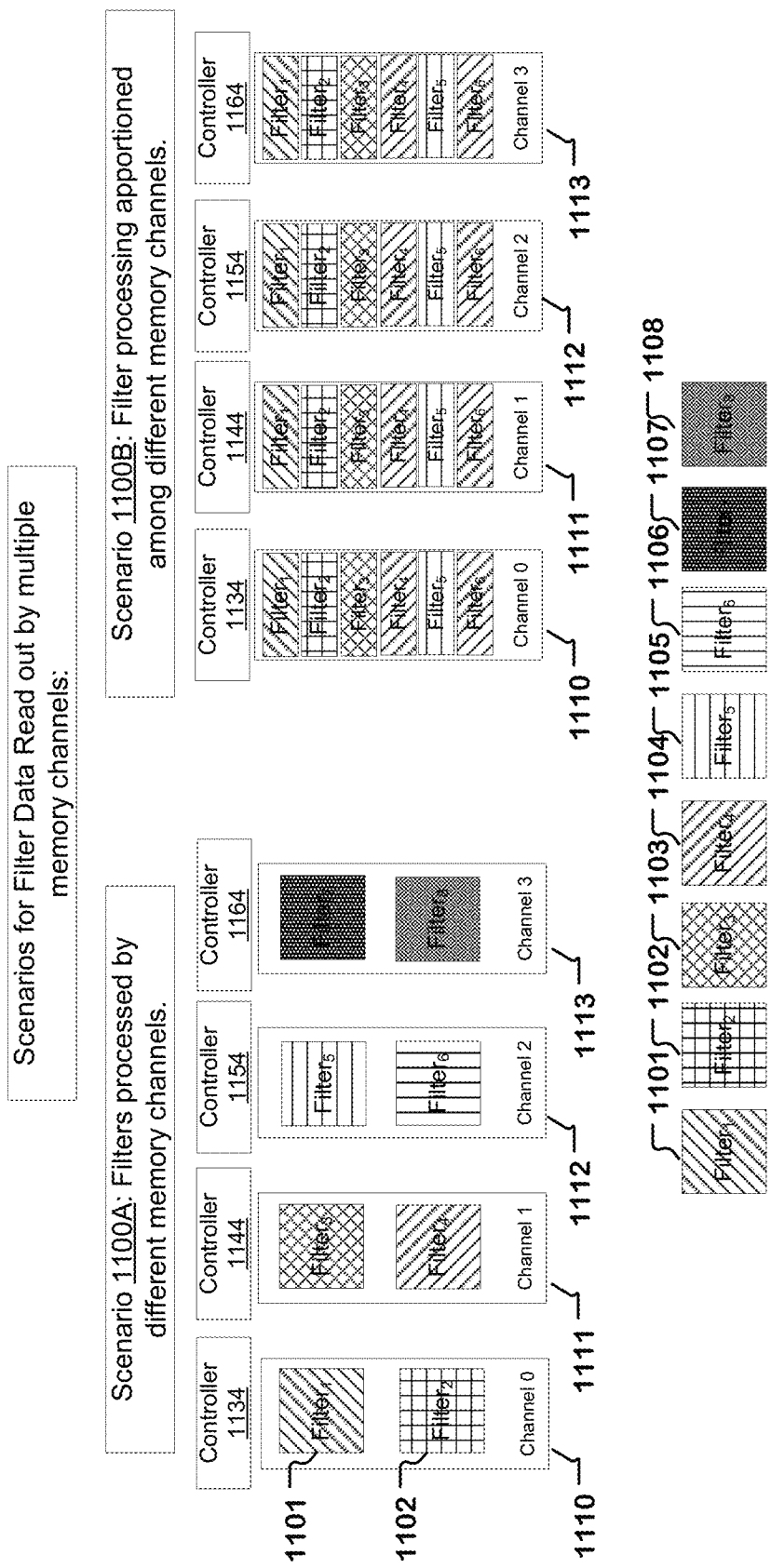
FIG. 11 is a schematic diagram illustrating multiple scenarios for allocating weight data among multiple NVM channels by a high bandwidth NVM in accordance with the technologies as described herein.

FIG. 11 is a schematic diagram illustrating multiple scenarios for allocating weight data among multiple NVM channels by a high bandwidth NVM in accordance with the technologies as described herein. Appropriate storage scenarios according to the present technology can provide for retrieval of the weights for two or more groups of weights (e.g., filters) without necessitating a read of an additional page of memory. For example, weights can be stored such that retrieval of all groups for the layer can be performed without necessitating triggering additional page of memory. In FIG. 11, weight data belonging to a plurality of filters (filter 1-filter 7) 1101-1108 can be read out by multiple memory channels (channel 0-channel 3) 1110-1113. A memory channel is used for data transfer via pathways to and from dies implementing non-volatile storage arrays. In some implementations, the controller can be shared by, i.e., can control, multiple channels as illustrated by 434, 444 in FIG. 4, which control channels 0-3 and channels 4-7 respectively.

In scenario 1100A, weights grouped according to filters can be allocated to individual memory channels. For example, the weights for filter 1 1101 and filter 2 1102 are stored for retrieval by channel 0 1110. Accordingly, weights from filters can be stored to or retrieved from multiple arrays contemporaneously using multiple NVM channels. In this configuration, weights belonging to different filters can be read contemporaneously using different channels, however, if weights from different groups assigned to the same channel need to be read, for example from filter 1 and filter 2 in scenario 1100A of FIG. 11, both belonging to channel 0 1110, then multiple page reads might need to occur.

In scenario 1100B, weights grouped according to filters are allocated to storage space across different channels. With reference to FIG. 11, the weights for filter 1 through filter 6 1101-1106 are apportioned among each of the four available channels (channel 0-channel 3) 1110-1113. In this scenario, weight data distributed among the multiple channels can be read in contemporaneously from NVM arrays by each of channel 0 through channel 3 1110-1113. Further, read operations against the NVM arrays of each channel have the capability to read weight data for each of the filters without necessitating a page retrieval when switching read operations from one filter to the next filter.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

As used herein, a network node, including network nodes referred to as client side nodes and a server side nodes, is an application hosted on an active electronic device, or virtual device executed in an active electronic device such as a cloud-based platform, that is attached to a network, and is capable of sending, receiving, or forwarding information in support of computer programs such as servers and clients, over a physical media for a communications channel on the network, and having for example media access control addresses and protocol stacks that support higher network layers. A network can include the networks using Internet Protocol addresses, or other type of network layer addresses. In some embodiments the network comprises the Internet. Examples of electronic devices which can host network nodes, include all varieties of computers, workstations, laptop and desktop computers, hand-held computers and smart phones, and cloud-based platforms.

A byte is a basic storage unit used in many integrated circuit logic and memory circuits and consists of eight bits. Basic storage unit can have other sizes, including for example one bit, two bits, four bits, 16 bits and so on. Thus, the description of a high bandwidth NVM set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four-bit storage units combined with eight-bit storage units.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An artificial intelligence (AI) inference memory device, comprising:
   a logic layer die including channel logic implementing connections between a plurality of channels for conducting data to and from an accelerator core via at least one bus; and
   a plurality of non-volatile memory (NVM) dies storing arrays of weights and stacked vertically one above another, forming a layered vertical stack of NVM dies, each of the NVM dies including at least one memory chip and a plurality of direct vertical connections to a corresponding channel logic in the logic layer, the stacked NVM dies being organized into banks of NVM dies,
   wherein the logic layer die includes, for each bank of NVM dies, a respective controller to execute interface commands with one or more NVM dies of the corresponding bank.

2. The AI inference memory device of claim 1, wherein the controllers for the banks of NVM dies are configured to execute the interface commands in parallel and to contemporaneously provide arrays of weights, of the stored arrays of weights, to a processor chip including the accelerator core.

3. The AI inference memory device of claim 1, wherein the interface commands include a read neural network weights data command, and a write neural network weights data command.

4. The AI inference memory device of claim 1, wherein the plurality of NVM dies are arranged in two stacks of four NVM dies on the logic layer die, and provide data to eight parallel channels.

5. The AI inference memory device of claim 4, wherein the interface commands are executed by memory corresponding to a plurality of channels in parallel; thereby achieving 50 GB/second throughput to the accelerator core.

6. The AI inference memory device of claim 1, wherein a corresponding channel, of the plurality of channels, further includes an interface to a substrate mounting a processor or field programmable gate array (FPGA) that performs neural network computations and a static random-access memory (SRAM) storing activation data for use in neural network computations.

7. The AI inference memory device of claim 6, wherein storing activation data includes storing a non-linear function for relating relationships between input and output of a neural network.

8. The AI inference memory device of claim 6, wherein storing activation data includes storing data implementing an activation function selected from at least one of a sigmoid function, a hyperbolic tangent (tanh) function, a rectified linear unit (ReLU) function, a leaky rectified linear unit (LReLU) function, and a maxout function.

9. The AI inference memory device of claim 1, wherein a corresponding channel, of the plurality of channels, further includes an interface to a substrate mounting a processor or a field programmable gate array (FPGA) that performs neural network computations and a dynamic random-access memory (DRAM) storing activation data for use in neural network computations.

10. The AI inference memory device of claim 1, wherein the NVM of the plurality of NVM dies is one of a phase change memory (PCM), a three-dimensional cross point memory (3D Xpoint), a NOR flash memory, a resistive random-access memory (RRAM), a magneto-resistive random-access memory MRAM, a ferroelectric random-access memory FeRAM, a conductive bridge random-access memory CBRAM, and a NAND flash memory.

11. The AI inference memory device of claim 1, wherein the direct vertical connections comprise via-to-via connections of a through silicon via (TSV) integrated circuit.

12. The AI inference memory device of claim 1, further including an interposer layer to which the logic layer and a vertical stack comprising the plurality of NVM dies are affixed; wherein the interposer layer provides connection between the plurality of direct vertical connections of the vertical stack to corresponding channel logic in the logic layer; thereby packaging the AI inference memory device as a 2.5D through silicon via (TSV) integrated circuit.

13. The AI inference memory device of claim 1, further including an interposer layer to which the logic layer is affixed; wherein the plurality of NVM dies are stacked vertically above the logic layer and the interposer layer in a vertical stack; thereby establishing connections between the plurality of direct vertical connections of the vertical stack to corresponding channel logic in the logic layer; thereby packaging the AI inference memory device as a three-dimension (3D) through silicon via (TSV) integrated circuit.

14. The AI inference memory device of claim 13, wherein a plurality of solder bumps that have been deposited onto chip pads of the logic layer and the plurality of NVM dies provide connection with a device immediately below.

15. The AI inference memory device of claim 13, wherein a plurality of backside interconnects have been deposited onto chip pads of the logic layer and the plurality of NVM dies provide wafer-to-wafer connection with a device above; thereby packaging the AI inference memory device as a three-dimensional (3D) system-on-chip (3D SOC) integrated circuit.

16. An artificial intelligence (AI) inference method conducted by a processor coupled with a logic layer die including channel logic implementing connections between a plurality of channels conducting data to and from an accelerator core via at least one bus, and a plurality of non-volatile memory (NVM) dies storing arrays of weights and stacked vertically one above another, forming a layered vertical stack of NVM dies, each of the NVM dies including at least one memory chip and a plurality of direct vertical connections to a corresponding channel logic in the logic layer, the stacked NVM dies being organized into banks and the logic layer die including, for each bank of NVM dies, a respective controller to execute interface commands with one or more NVM dies of the corresponding bank, the method comprising:
  implementing the respective controller for each bank of NVM dies to retrieve from the plurality of NVM dies that are stacked vertically above the logic layer die, a plurality of weights of the arrays of weights stored therein;
  using the accelerator core, applying the plurality of weights to input data for each one of a plurality of nodes of a neural network to obtain an intermediate output;
  applying activation data to the intermediate output to obtain a result for a neural network level; and
  storing the result in at least one of the plurality of NVM dies, an FPGA buffer, and an activation memory facilitating computations at additional neural network levels until a final result is reached.

17. The AI inference method of claim 16, wherein applying activation data includes applying stored data implementing an activation function selected from at least one of a sigmoid function, a hyperbolic tangent (tanh) function, and a rectified linear unit (ReLU) function.

18. The AI inference method of claim 16, wherein the plurality of NVM dies are arranged in two stacks of four NVM dies on the logic layer die, and wherein the method further comprises providing data to eight parallel channels.

19. An AI inference system, comprising:
  a substrate coupling:
    a processor chip including an accelerator core,
    a first memory chip suitable for storing activation functions, and
    an artificial intelligence (AI) inference memory device for storing arrays of weights, the memory device comprising:
      a logic layer die including channel logic implementing connections between a plurality of channels for conducting data to and from the accelerator core via at least one bus; and
      a plurality of non-volatile memory (NVM) dies storing arrays of weights and stacked vertically one above another, forming a layered vertical stack of NVM dies, each of the NVM dies including at least one memory chip and a plurality of direct vertical connections to a corresponding channel logic in the logic layer, the stacked NVM dies being organized into banks of NVM dies, wherein the logic layer die further includes, for each bank of NVM dies, a respective controller to execute interface commands with one or more NVM dies of the corresponding bank, wherein the processor chip applies weights, of the stored arrays of weights, retrieved from the NVM dies to specific inputs and applies activation functions retrieved from the first memory chip to provide inferencing output; and wherein the inference system is implemented as a multichip module in a single package.

20. The AI inference memory device of claim 1, further including activation memory storing activation data for use in neural network computations, wherein the logic layer die including the controllers and the plurality of NVM dies are part of a particular vertical stack, wherein the activation memory is part of a vertical stack that is different from the particular vertical stack and wherein the accelerator core is part of another vertical stack that is different from both the particular vertical stack and the vertical stack including the activation memory.

* * * * *